United States Patent [19]
Oliver

[11] Patent Number: 5,870,302
[45] Date of Patent: Feb. 9, 1999

[54] EVAPOTRANSPIRATION REMOTE IRRIGATION CONTROL SYSTEM

[75] Inventor: Michael J. Oliver, Thousand Oaks, Calif.

[73] Assignee: Waterlink Systems, Inc., San Diego, Calif.

[21] Appl. No.: 595,747

[22] Filed: Feb. 2, 1996

Related U.S. Application Data

[63] Continuation-in-part of Ser. No. 524,079, Sep. 6, 1995, abandoned, which is a continuation of Ser. No. 197,691, Feb. 17, 1994, abandoned.

[51] Int. Cl.$^6$ ................................................. G06F 19/00
[52] U.S. Cl. ................. 364/140.01; 239/69; 364/528.19
[58] Field of Search ........................ 364/420, 509, 364/510, 188, 189, 143, 144, 145, 146, 528.19, 140.01; 239/63, 67–70; 137/624.11–624.2; 702/2

[56] References Cited

U.S. PATENT DOCUMENTS

| | | |
|---|---|---|
| 4,165,532 | 8/1979 | Kendall et al. ........................ 364/420 |
| 4,176,395 | 11/1979 | Evelyn-Veere et al. ................ 364/420 |
| 4,244,022 | 1/1981 | Kendall .................................. 364/420 |
| 4,396,149 | 8/1983 | Hirsch .................................. 239/69 X |
| 4,545,396 | 10/1985 | Miller et al. ......................... 239/69 X |
| 4,646,224 | 2/1987 | Ransburg et al. ..................... 364/143 |
| 4,740,882 | 4/1988 | Miller .................................. 364/132 |
| 4,755,942 | 7/1988 | Gardner ................................ 364/420 |
| 4,760,547 | 7/1988 | Duxbury ............................... 364/420 |
| 4,799,142 | 1/1989 | Waltzer et al. ....................... 364/143 |
| 4,962,522 | 10/1990 | Marian ................................ 239/70 X |
| 4,992,942 | 2/1991 | Bauerle et al. ....................... 364/420 |
| 5,023,787 | 6/1991 | Evelyn-Veere ........................ 364/420 |
| 5,097,861 | 3/1992 | Hopkins et al. ..................... 239/69 X |
| 5,229,937 | 7/1993 | Evelyn-Veere ........................ 364/420 |

OTHER PUBLICATIONS

Network Services Corporation, *Percentage Control Adapter, Model PCA–12/24*, 1991.
Hydro–scape Products, Inc., *The Modified Atmometer for Irrigation Management*; Date Unknown.
California Sensor Corporation, *The Calsense Command I*; Date Unknown.
The Toro Company 1991, *Motorola, MIR 5000 Radio BAse Irrigation Central Computer Control System, Government Series*; 1991.
Rain Bird Sprinkler Mfg. Corp., *Maxicom Computer Control System*; 1990.
Rain Bird Sprinkler Mfg. Corp., *Weather Station Maxicom*; Date Unknown.
Rain Bird Sprinkler Mfg. Corp., *Maxicom Jr. Computer Control System*; 1990.

*Primary Examiner*—Joseph Ruggiero
*Attorney, Agent, or Firm*—Fish & Richardson P.C.

[57] ABSTRACT

A system and method for using evapotranspiration (ET) and/or predicted precipitation data in controlling automated and semi-automated irrigation systems. In accordance with the present invention, meteorological data is monitored and used to adjust watering schedules for an irrigation site. A central computer uses the meteorological data and ET data to compute a watering factor. The watering factor represents the difference between a reference watering schedule (which can be stored at the irrigation site) and a new watering schedule. The new watering schedule can be based on similar climatic conditions of a geographic area in which the irrigation site is located. The watering factor is then sent to the irrigation site, which uses the watering factor to modify the reference watering schedule, if appropriate. Alternatively, meteorological data and site characteristics can be monitored at the irrigation site and sent to the central computer, which then computes the watering factor based on this specific site information. The computed ET data is preferably based on a current prediction of future events based upon present meteorological conditions. The system and method of the present invention achieves a substantial savings in water usage.

28 Claims, 9 Drawing Sheets

EVAPOTRANSPIRATION REMOTE IRRIGATION CONTROL SYSTEM

RELATED APPLICATIONS

This application is a continuation-in-part application of co-pending U.S. Pat. application Ser. No. 08/524,079, filed on Sep. 6, 1995 now abandoned, entitled "Evapotranspiration Forecasting Irrigation Control System," abandoned which is a continuation of U.S. Pat. application Ser. No. 08/197,691, filed Feb. 17, 1994, now abandoned.

BACKGROUND OF THE INVENTION

1. Field of the Invention

This invention relates to irrigation control systems, and more particularly to automated and semi-automated irrigation control systems for large or small landscape sites using evapotranspiration and precipitation data.

2. Description of Related Art

The term evapotranspiration (ET) is used in the irrigation field to quantify how much water has been lost from soil through transpiration by plants. An ET value is calculated using actual meteorological data obtained from meteorology stations. The factors typically used to calculate an ET value are temperature, solar radiation, wind speed, vapor pressure or humidity, and barometric pressure. A change in one or more of these parameters can have a direct effect on the ET value used to determine when and how much to water. ET values are usually normalized to a specific type of vegetation. One of these ET values is ETo which is for 4"–6" tall cool-season grass. ET values are then used in conjunction with other coefficients to determine how much water to apply to replenish the water lost from the soil. Factors that affect determination of the amount of water include the following: (1) type of vegetation; (2) soil type; (3) root depth; (4) topography; (5) micro-climate; and (6) density of vegetation. These factors are explained further below.

Vegetation Type.

For a particular type of vegetation, such as cool season grass, the ET value represents the amount of water that has to be spread over the vegetation to replace the moisture lost by the natural and ongoing process of evaporation and transpiration. Accordingly, ET values are usually normalized to a specific type of plant or crop. For example, various plants require different amounts of moisture in the soil to sustain an optimal appearance and healthy growth environment. Plants which are drought-tolerant require less water than a baseline crop, such as grass, while lush plant types require more water. A crop coefficient (Kc) value is used to adjust the baseline ETo value for a particular plant type. For example, the crop coefficient Kc for shrub-type plants might be 0.5, while the Kc for cool-season grass might be 0.8. In addition, the Kc is also dependent on the time of year. That is, the Kc function is cyclic in nature, with the maximum generally occurring during the spring and the minimum during the winter.

Soil Type.

The ability of soil to absorb and retain applied water is an important consideration in determining how much and how often to water. Sandy soils do not retain water well, so less water with more frequency is needed, or water will percolate beyond the root zone and be wasted. On the other hand, clay soils retain water well, meaning more water with less frequency can be applied. In applying water, the absorption rate also needs to be taken into account to avoid water run off. Sandy soils have a high absorption rate as compared to clay soils. In the latter case, the total amount of water to apply needs to be divided into multiple watering cycles with each cycle having a relatively short watering time with a waiting time between cycles.

Root Depth.

The root zone depth of plants to be watered must also be taken into account. If too much water is applied, the water will percolate beyond the root zone and be wasted. Root zone depth also affects the frequency of watering. A plant with a deep root zone needs less frequent but longer watering times. A plant with a shallow root zone needs more frequent but shorter watering times.

Topography.

Topography is an important consideration in watering, since a steep slope will have a higher amount of run off than a shallow slope. Steeper slopes require multiple cycles with short watering times and wait times between cycles to allow penetration of the applied water into the soil.

Micro-climate.

Micro-climate takes into account existing conditions immediately surrounding the area which is to be watered. These conditions can include fully or partial shaded areas, parking lot areas, park areas with trees, etc. Since shaded areas do not require as much water as sunlit areas, less water is needed. A micro-climate coefficient (Kmc) value is used to adjust the baseline ETo value for a particular site.

Vegetation Density.

Density of the vegetation which is to be watered is also used in determining the amount of water to be applied. As density of vegetation increases, more water will transpire from the leaf area, requiring an increase in the amount of water needed. A vegetation density coefficient (Kd) value is used to adjust the baseline ETo value for a particular plant density.

Although prior art systems have used ET computations to determine watering schedules for irrigation systems, one drawback of such systems has been that they have relied upon current or historical meteorological data. Consequently, an ET value for a particular site or zone can be computed that indicates water should be applied without regard for probable changes in local weather conditions. Thus, a watering schedule may be computed that applies water today without regard for a forecast of precipitation or other significant meteorological events tomorrow.

Other prior systems that use ET data require on-site weather stations or ET measurements, along with central or host computers to perform irrigation watering calculations. These systems are generally not cost-effective for most small landscape sites and can require on-site system operators.

For small landscapes, such as that found at a single home site, prior art practices for water management of irrigation primarily consists of automatic or manual shutoff during rain and seasonal scheduling of use.

Thus, a drawback of conventional irrigation control systems is the lack of capability to account for all the changing weather-related parameters (such as rainfall, temperature, solar radiation, wind speed, humidity, seasonal plant requirements, forecasts, etc.) at a cost-effective price. Use of conventional irrigation control systems results in a deviation from optimum watering schedules and causes either more water to be used or not enough water, which, in turn, stresses the plants.

Accordingly, a need exists for an improved irrigation control system that can cost-effectively schedule watering amounts to optimize use. This can be accomplished by apportioning some functions to the local irrigation site and some to a remote host computer that gathers both predicted and historical meteorological data for the geographic and climatic area where the site is located and that offers an on-line service for ET based scheduling. A further need exists for such an improved system that also uses an ET and/or precipitation calculation that takes into account forecast weather data. The present invention provides a cost-effective method and apparatus that meet these needs.

SUMMARY OF THE INVENTION

The present invention is a method and apparatus for efficiently controlling irrigation at irrigation sites within an irrigation control system. The present invention may comprise an automated or semi-automated irrigation system and may use evapotranspiration (ET) or predicted precipitation data in controlling the irrigation system.

In accordance with the present invention, irrigation control functions are performed both by a central (or host) computer and by localized site control devices located at irrigation sites remote from the host computer. At the site, a site control device can store a reference watering schedule, which is based upon selected characteristics of the particular irrigation site, such as vegetation type, soil type, root depth, etc. The host computer computes a watering factor, which represents the amount of change (delta) between the reference watering schedule and a new watering schedule. The new watering schedule is based upon computed ET data, including forecast meteorological data or forecast precipitation data, both of which are preferably based on a current prediction of future events based upon present meteorological conditions. The watering factor may be expressed, for example, as a percent change or as minutes of watering to apply or withhold. The watering factor is then sent to a site control device, and the watering factor is then used to update the reference watering schedule. This updated watering schedule is then used to control irrigation valves (e.g., sprinklers) coupled to the site control device. By using predicted or forecast meteorological data, a substantial savings in water use can be achieved.

In the present invention, the host computer may be coupled to the site control devices in a variety of ways. For example, the host and the site control devices at all sites may be coupled by wireless links, such as radio or microwave, or may be hard-wired together, such as by telephone lines. Alternatively, the host may be coupled (either by wireless link or hardwired) to a single site control device, which may be in turn coupled to one or more "satellite" site control devices.

The watering factor may be computed from a variety of data. For example, the watering factor may be computed from meteorological data and forecasted weather conditions collected by the host computer. Alternatively, a "closed loop" system may be provided, in which meteorological (and even other) data may be collected and stored by each of the site control devices, which data is then sent to the host computer and incorporated into the computation of the watering factor. In such a closed loop system, the host computer can be configured such that it computes a unique watering factor for each site and irrigation zone within the site.

Another method would be to use a universal watering factor for irrigation sites located in a geographical area with similar climate conditions and to share the data requirements to determine the watering schedule between the host computer and the site control devices. For example, the host computer would utilize representative meteorological data to compute ET values, and the site control devices would utilize data on the site characteristics to determine baseline conditions of the site that are not generally subject to change. In this way, only one-way communications from the host computer to the site control devices is needed. This method considers all the necessary parameters to calculate ET based schedules upon predicted meteorological data and provides for the adjustment of watering schedules to optimize use at a lower cost to savings ratio.

Past or historical meteorological data may be used to make corrective adjustments to the watering schedules that have been predicted using meteorological forecasting. That is, as each day becomes past or historical, adjustments to the overall cumulative depletion of water in the soil need to be made. When an irrigation site is to be updated with a new watering schedule, actual meteorological data is first used to correct any differences between the previously forecast and actual meteorological data to the current day.

After past cumulative depletion has been determined, future predictions of the ET and other meteorological values are used to determine when and how much to water. Future meteorological data predictions can be updated or modified as new data becomes available, thereby allowing closer matching of predicted ET values with actual ET values. Modifying meteorological data on a daily basis results in predictions that more closely follow actual ET values than updating on a weekly or longer schedule.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Determining Watering Needs

Evaluation of when to water a particular zone ideally is based upon determination of two parameters, the irrigation deficiency level and the full field capacity. The irrigation deficiency level is the point where vegetation has a certain percentage of moisture available in the soil. (Since soil depth can exceed root zone depth, the moisture content level of concern is the root zone of the local vegetation.) When the moisture content of the soil in a watering zone drops below the irrigation deficiency level, the water content of the soil must be increased to sustain healthy plant life. This may be done by precipitation from the atmosphere (e.g., rain) or, more commonly, by using an irrigation system. The amount of water applied should be enough replace the moisture loss to the full field capacity of the soil. Selecting the irrigation deficiency level is site specific, and is based on some of the factors discussed above. In addition, turf and plant life do best when irrigation waterings are far apart.

Figure 1:
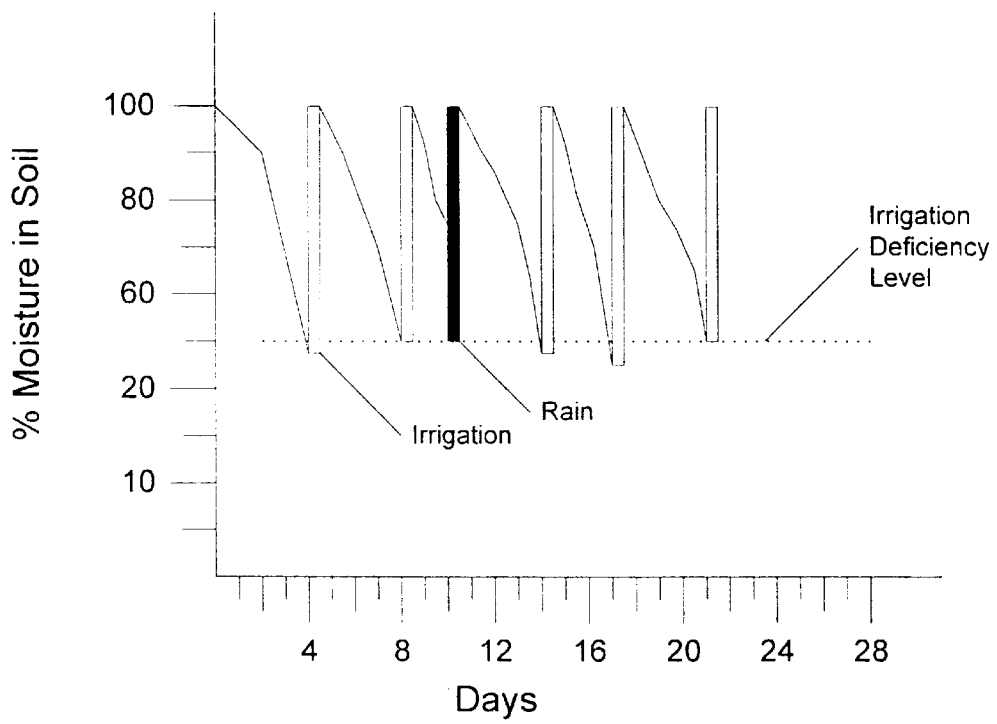
FIG. 1 shows a chart of historical moisture depletion data for soil in a particular zone.

FIG. 1 shows a chart of historical moisture depletion data for soil in a particular zone, and the irrigation and precipitation cycles required to bring the water available in the soil back up to full field capacity. The solid line represents the daily moisture content of the soil. Starting with 100% available moisture in the soil, each day the moisture content in the soil decreases. By day 4, the moisture in the soil has decreased below the irrigation deficiency level required by the vegetation. Water is then applied to bring the moisture in the soil back to full field capacity. That is, a watering cycle provides enough water to make up the difference between the irrigation deficiency level and the full field capacity for a particular irrigation zone.

On days on which irrigation or precipitation occur, the computed moisture content of the soil is adjusted to take into account the amount of water applied. Ascertaining the moisture depletion level could be made by direct measurement using arrays of moisture sensors. However, for large areas, installing and maintaining such sensors is costly and often impractical or impossible. Accordingly, for large areas, the moisture depletion level for each zone in the area is estimated based on both empirical and physical observations (e.g., type of plant, root depth, slope, sprinkler type and efficiency, etc.) and meteorological data values and derivations (i.e., normalized ET).

Meteorological Forecasts

A problem addressed by the present invention is shown in FIG. 1 at day 8. Because the moisture content of the soil has reached the irrigation deficiency level, a full watering cycle is begun to bring the moisture content back to the full field capacity. However, on day 10, it rains more than enough to have supplied the necessary water replenishment. Thus, the excess water supplied by precipitation is wasted.

In accordance with the present invention, the conventional use of ETo values is modified to take into account predicted or forecast weather events. By using forecast weather data in computing ETo values, a substantial savings in water use can be achieved for several reasons. The present invention comprises a method for irrigating an irrigation site by processing forecast weather data in a computer system to automatically maintain the soil moisture content of the site essentially between the irrigation deficiency level and the full field capacity over a prolonged period of time.

For example, precipitation is the natural way to replenish the moisture content of soil. Using precipitation as a replacement for irrigation water saves the cost of purchased water. If precipitation is predicted, a different irrigation schedule can be computed. It is advantageous to have all the moisture from the atmosphere applied to bring the moisture in the soil back to full field capacity. For example, referring to FIG. 1, the percent of moisture in the soil on day 8 indicates that irrigation is required. In the prior art, water would be applied until the full field capacity is met. However, if irrigation water is applied to full field capacity, all of the moisture from the precipitation on day 10 could not be used for replenishing the moisture in the soil. The excess water will be wasted as runoff or percolation beyond the root zone.

Figure 2:
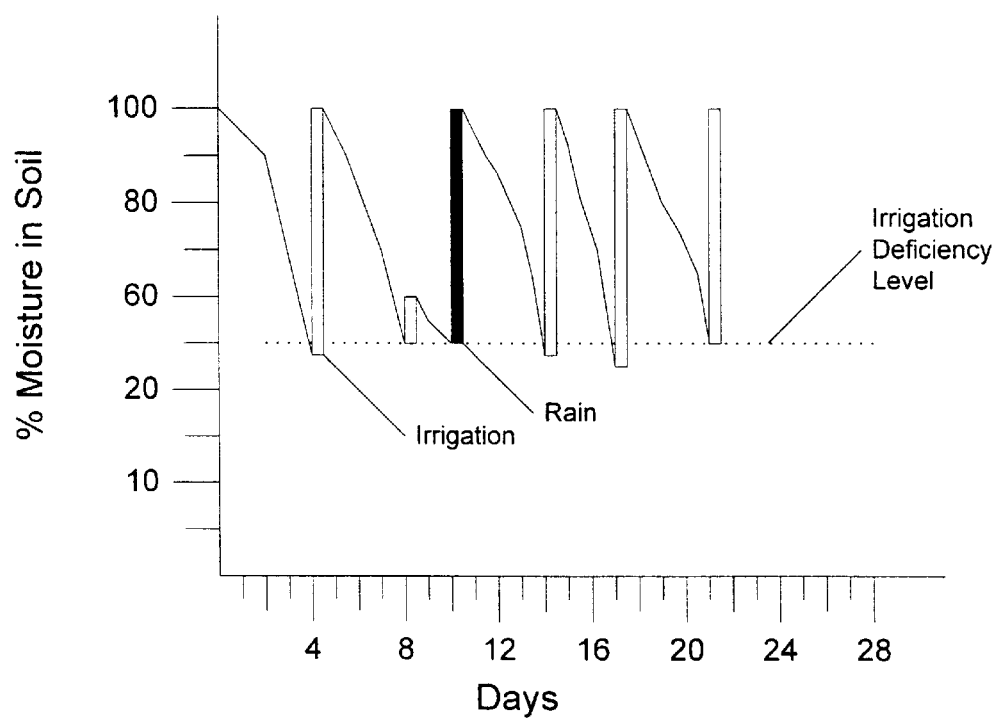
FIG. 2 shows a chart of moisture depletion data for soil in a particular zone, using the present invention to adjust watering schedules to account for predicted precipitation.

Using the present invention, by knowing that a certain amount of precipitation is predicted for day 10, irrigation on day 8 is adjusted just enough to maintain the moisture content above the irrigation deficiency level until day 10, as shown in FIG. 2. Thus, 100% of the precipitation that falls on day 10 can then be put to use to replenish the moisture content of the soil. If the actual precipitation that falls on day 10 is less than the amount required to reach full field capacity, that fact would then be taken into account in computing the next irrigation schedule.

Another example of water savings from using forecast weather data in computing ETo values results when high winds are predicted. High winds can distribute water outside of the intended watering zone (e.g., sidewalks and parking lots). Such wastage requires more water to be applied then under conditions of low winds to achieve the same soil moisture content. The solution to this problem is to not water when high wind speed conditions are predicted, but rather to reschedule irrigation for when wind speeds are predicted to drop to acceptable levels.

Forecast of Weather Conditions

In accordance with the present invention, forecasts of weather conditions can be used to determine when and how much to water when setting up a watering schedule. By forecasting what the future depletion of water from the soil will be due to predicted weather conditions, the watering schedule for the next time period (e.g., a week) can be computed. In addition, forecasts of precipitation can also be taken into account to determine when and how much to water. The probability of needing to water is directly related to the meteorological conditions that have already occurred and which are predicted to occur.

Figure 3:
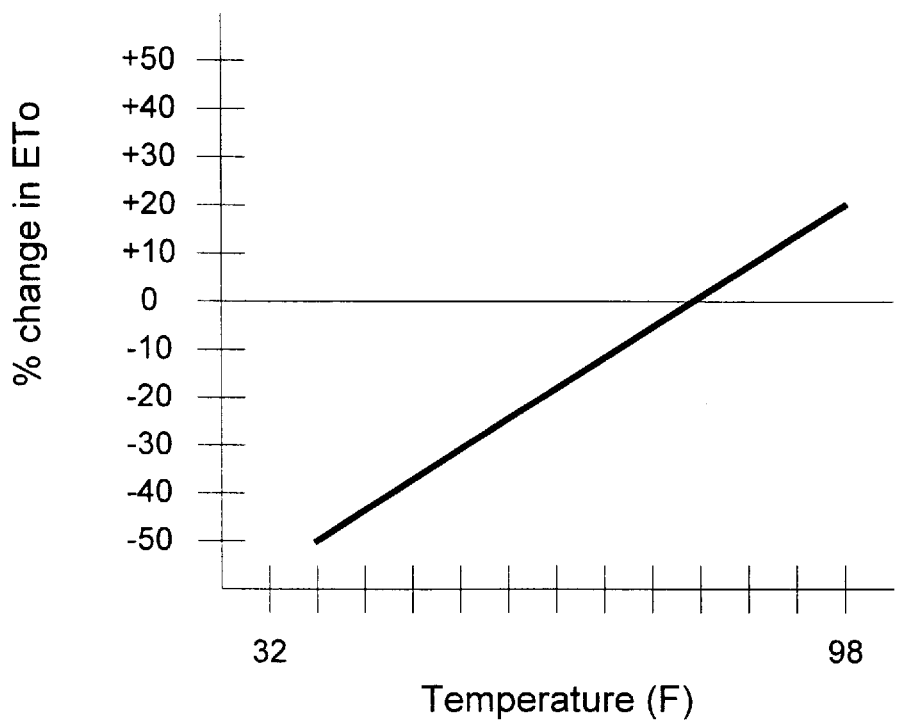
FIG. 3 is an example of the changes in ETo which can be expected due to an increase or decrease in temperature.
Figure 4:
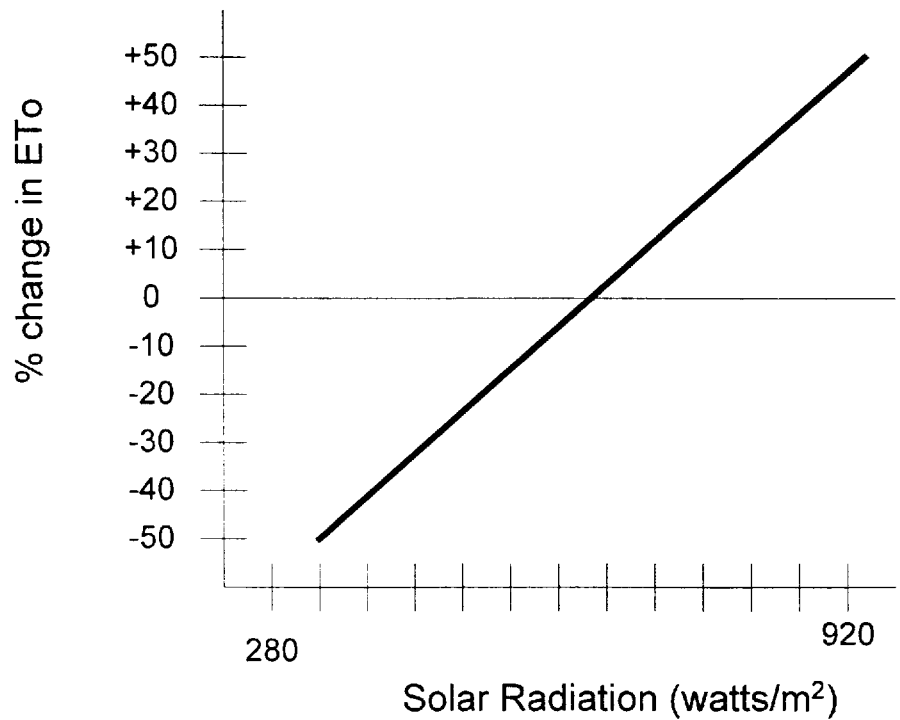
FIG. 4 is an example of the changes in ETo which can be expected due to an increase or decrease in solar radiation.

For example, FIGS. 3 and 4 show how predicted weather changes can be used to determine a decrease or increase in the moisture content of soil. FIG. 3 is an example of the changes in ETo which can be expected due to an increase or decrease in temperature. By first predicting what the temperature will be in the future, an initial ETo can be calculated. Warming trends in the weather will increase the rate at which water is depleted from the soil. If a warming trend is predicted, the ETo value will increase, thereby requiring more water to be applied to replenish the moisture in the soil to field capacity. Cooling trends will decrease the rate at which water is depleted from the soil. A decrease in the ETo value would require less water to be applied to replenish the moisture in the soil.

FIG. 4 shows how solar radiation affects the ETo value. A strong sun will have an effect of increasing the ETo value, while overcast conditions would decrease the ETo value. Similarly, vapor pressure or humidity, wind speed, barometric pressure, and time of year also have an affect on the ETo value.

Thus, the amount and rate which water evaporates from the soil and transpires from plants is dependent on the weather conditions. If the meteorological conditions are known at the site, then the amount of water depleted from the soil can be calculated based on specific parameters. The goal is to apply just enough water to replenish the soil to maintain healthy plants and turf without wasting water. Too much water applied will run off or percolate beyond the root depth of the plants and be lost. Not enough water will cause stress to the plants.

Meteorological forecasting data can be obtained from weather reports from the National Weather Service (NWS), private weather services, television, newspapers, or analyzing changes in current weather conditions. Warming and cooling trends are used to predict the evapotranspiration rates from plants and turf, while predicted rainfall is directly taken into account in computing the amount of water to apply.

If desired, ETo values for a particular site can be predicted based upon a meteorological model for that site. The model can be simple or elaborate. For example, a simplistic algorithm can be that tomorrow's weather conditions can be approximated by a linear or weighted average of the conditions for the past n days. A more complex algorithm would predict future meteorological conditions on an hourly basis. In between these two extremes, assumptions can be made about one or all of the variables that are part of calculating the ETo value. Data which can be included in future predictions are rainfall, temperature, humidity or vapor pressure, solar radiation, wind speed, cloud cover, the date and time of the year, and long term seasonal averages. A number of prior art methods exist for making such predictions. The present invention uses any convenient prediction method.

Past or historical meteorological data is used to make corrective adjustments to the watering schedules that have been predicted using meteorological forecasting. That is, as each day becomes past or historical, adjustments to the overall cumulative depletion of water in the soil need to be made. When a site is to be updated with a new watering schedule, actual meteorological data is first used to correct any differences between the previously forecast and actual meteorological data to the current day. Such data may be obtained from a number of sources, including government managed weather stations such as CIMIS (the California Irrigation Management Information System, maintained by the California Department of Water Resources) and NWS. Other sources might include private weather services, television, newspapers, etc.

After past cumulative depletion has been determined, future predictions of ETo and/or precipitation values are used to determine when and how much to water. Future meteorological data predictions can be updated or modified as new data becomes available, thereby allowing closer matching of predicted ETo values with actual ETo values. Modifying meteorological data on a daily basis results in predictions that more closely follow actual ETo values than updating on a weekly schedule.

The current day can be considered either past or future, depending on whether the watering schedule has already occurred. The current day is considered past if the watering schedule has already occurred. On the other hand, if the watering schedule has not yet occurred for the current day, the watering schedule is considered future and can be updated if necessary.

After each day's predicted value ETo has become past or historical, the cumulative moisture depletion needs to be checked for any differences between the predicted and actual ETo values. If the predicted ETo value was lower than the actual ETo value, the cumulative depletion value would be increased. An increase in the cumulative depletion value would be taken into account in computing the next watering schedule. If the predicted ETo value was higher than the actual ETo value, the cumulative depletion value would be decreased. If the cumulative depletion value becomes negative (full field capacity), the water which was applied is assumed to have percolated beyond the root zone and is therefore lost. The cumulative depletion value is than set to zero, meaning the moisture is at 100% soil capacity in the root zone area.

In establishing irrigation schedules, other factors may be considered. For example, artificial restrictions on activating an irrigation schedule (days excluded) can be taken into account when determining the watering schedule. Types of restrictions can include local regulations that allow watering only on certain days of the week (e.g., odd days on/even days off). Restrictions can also be the result of building management policies (e.g., no watering during public events, etc.).

As another example, allowable appearance of vegetation may be a consideration when calculating when and how much to water. To maintain the best appearance and growth, no stress factor adjustment should be used in calculating the relevant ETo value. On the other hand, if it is only required to maintain adequate appearance and growth of vegetation, it is possible to use a deficit amount of water by applying a stress factor coefficient, Kadj, to modify the ETo value.

Additionally, while the present invention is designed for use without moisture sensors, such sensors can be used to monitor the actual amount of moisture applied to the soil. Further, sensors such as flow meters can be used to determine how much water is being applied. For example, situations occur when an irrigation system is intentionally or accidentally turned on or off. In such cases, feedback can tell how much (if any) sprinklers in a zone are watering, and the actual versus expected amount of watering can be used to correct future watering schedules. Other types of sensors which can be used in conjunction with the invention can be simple on/off flow sensors, precipitation sensors, and wind speed sensors.

Using Precipitation Predictions

Applying precipitation and future ETo predictions in computing ETo values requires a series of steps and corrective measures. First, a determination is made as to the chance that precipitation could appear in the near future, and how much. The predicted precipitation is then used as part of the calculations to update the predicted cumulative depletion of moisture from the soil.

The cumulative depletion level is the moisture content of the soil for a specific site, which is preferably updated on a daily basis. Daily depletion of the moisture in the soil will increase the cumulative depletion value, while natural precipitation (rain) or forced precipitation (irrigation) will decrease the cumulative depletion value.

For example, the day after rain is predicted, two things can happen. If it did rain, the actual amount of precipitation replaces the predicted value. On the other hand, if it did not rain on the day predicted, or the amount of rainfall was less than predicted, the cumulative depletion level of the soil needs to be corrected. The predicted rain amount is modified and the cumulative depletion level is adjusted to show that little or no rain occurred for that day. If the cumulative depletion level exceeds the irrigation deficiency level, a new watering time is scheduled.

Another important reason for using predicted weather for computed ETo values is that weather patterns and conditions change from year to year. In the prior art, ETo values used in irrigation scheduling have been computed on the basis of 30-year monthly ETo values to account for seasonal variations. The 30-year monthly values are an average ETo value for each month based over a 30-year period. Averaging the temperature over a number of years for a particular month will smooth the actual deviations from day to day, but the exact date when a hot or cold spell occurs can not be known. For example, a warming spell could occur during a month which is normally cool. If this occurs, the moisture within the soil would deplete faster than normal, requiring water to be applied through irrigation. The opposite can also occur. A cool spell could occur which would require less water to be applied to reach the full capacity of water for the soil.

Figure 5:
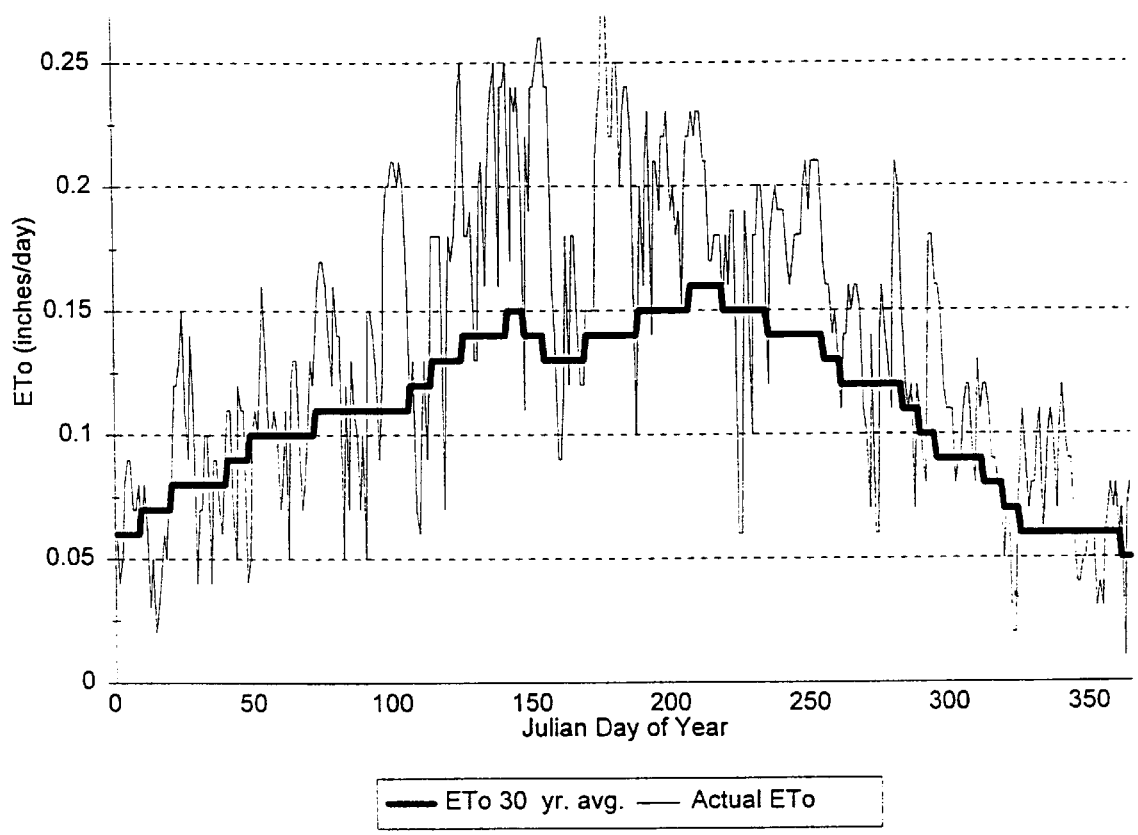
FIG. 5 is a graph of the difference between using actual meteorological variables to calculate a daily ETo value and the 30 year average ETo value.

The clear problem with using this method is that the ETo averages may or may not correspond with present day to day weather conditions. If the present day weather is hotter than the 30-year average, then ETo computations would be low, indicating that less water is needed. Likewise, a present day cold spell would lead to an ETo value that causes over watering. Most importantly, the 30-year averages do not take into account predicted precipitation. As an example, FIG. 5 shows the difference between using actual meteorological variables to calculate a daily ETo value and the 30 year average ETo value. The thick solid line on the graph represents the daily ETo values calculated from the 30-year monthly ETo values. The jagged line represents the ETo values calculated using actual meteorological variables.

Overview of the Inventive Irrigation System

Figure 6:
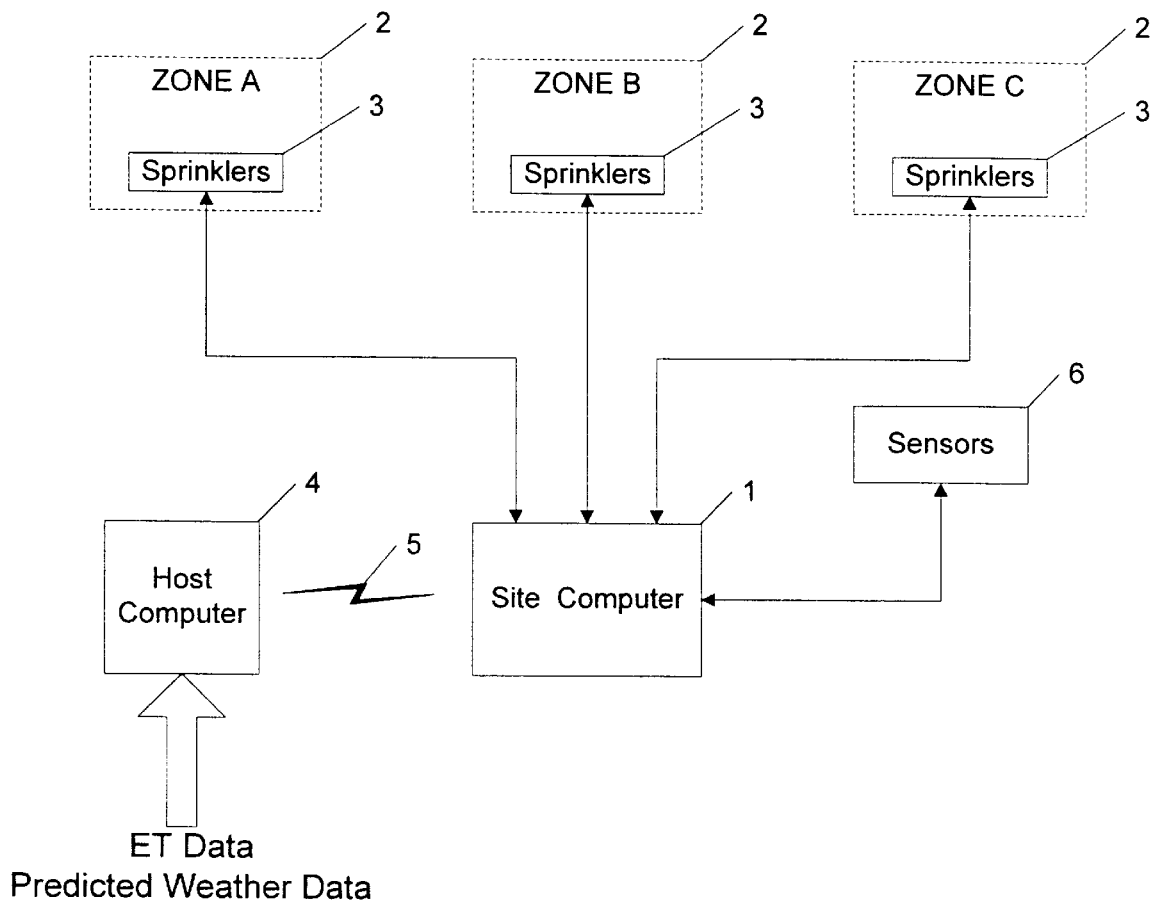
FIG. 6 is diagram showing an irrigation system in accordance with the present invention.

FIG. 6 is a block diagram of a typical irrigation system that may be used in conjunction with the present invention. A site computer 1 (which may be suitably implemented as a microcontroller, microprocessor, or personal computer type system), controls a plurality of zones 2, each of which represents a geographic site to be irrigated. Within each zone 2 is an irrigation or sprinkler system 3, the valves of which are remotely controllable by signals from the site computer 1, in known fashion. For large sites, more than one site computer 1 may be needed. Valve schedules are downloaded to and stored in each site computer 1.

A host computer 4 is designed to collect meteorological data, forecast future weather conditions, and generate future watering schedules for site computers 1. The host computer 4 manages all site computers 1 by saving historical, current, and future watering schedules. A watering schedule can be independently determined for each zone 2 and input as data to each site computer 1. Accordingly, an ETo value, taking into account the factors described above, can be computed for each zone 2 for purposes of determining a local watering schedule. The host computer 4 can be located at a different location then the site computers 1, and communicate with each site computer 1 by any convenient communications method 5, such as through direct wire connections, wireless communication (e.g., RF, VHF, UHF, or microwave frequencies), fiber optics, power lines, telephone cables, cellular telephones, wireless pager systems, television cables, infrared, and any other present or future method or means of communicating from one site to another remote site. In addition, any desired communication protocol can be used with any selected communication method 5.

Communications can be initiated by either the host computer 4 or a site computer 1. Once communication is established, the host computer 4 requests historical watering information, sensor data (if any), and operational status from the site computer 1. This information is then used to verify and check the operational status of the site computer 1, determine any site abnormalities (e.g., malfunctioning valves, excess water flow rate, etc.), and generate reports. The watering information is also used to correct any changes in the current and future watering schedules calculated by the host computer 4 for the site computer 1.

Meteorological data, both past and predicted, preferably are already stored in data files when the host computer 4 calls the site computer 1 or when the site computer 1 calls the host computer 4. Since the general ETo value is only dependent on the meteorological data, it is also calculated and stored in the meteorological data files. When the host computer 4 updates a site computer 1, the ETo value is then corrected based on specific coefficients and parameters for a zone 2 (e.g., vegetation type, micro-climate, etc.).

Once the historical and current watering conditions have been set up, the host computer 4 then projects a future watering schedule for that site computer 1, based on forecasting of meteorological conditions in the local area of the site computer 1. This raw data is then used to determine future precipitation and calculate a future ETo, taking into account wind speed, barometric conditions, and any other conditions which directly affect the watering schedule. A next watering schedule is then created and saved for future reference and sent to the site computer 1.

Each site computer 1 stores the watering schedule information received from the host computer 4. A site computer 1 may also have the ability to receive input from sensors 6 located on the site, to monitor such factors as wind speed, wind direction, humidity, solar radiation, temperature, and rainfall. Other feedback mechanisms that can be incorporated are rain shut off devices, rain gauges, moisture sensors, flow rate sensors, and pressure sensors. The site computer 1 may also have the ability to monitor the current and/or voltage levels of the sprinkler valves that are activated by the site computer 1 to determine operational status (as indicated by double-headed arrows to the sprinklers 3 in FIG. 6). Such information is then fed back to the host computer 4 for further use.

Each site computer 1 may also have multiple satellite controllers which can communicate with the site computer 1. Satellite controllers control the activation of a group of valves located at the site. Communication between the site computer 1 and satellite controllers can be through direct wire connections, wireless communication (e.g., RF, VHF, UHF, or microwave frequencies), fiber optics, power lines, telephone cables, cellular telephones, wireless pager systems, television cables, infrared, and any other present or future method or means of communicating from one site to another, remote site. In addition, any desired communication protocol can be used with any selected communication method.

Figure 8:
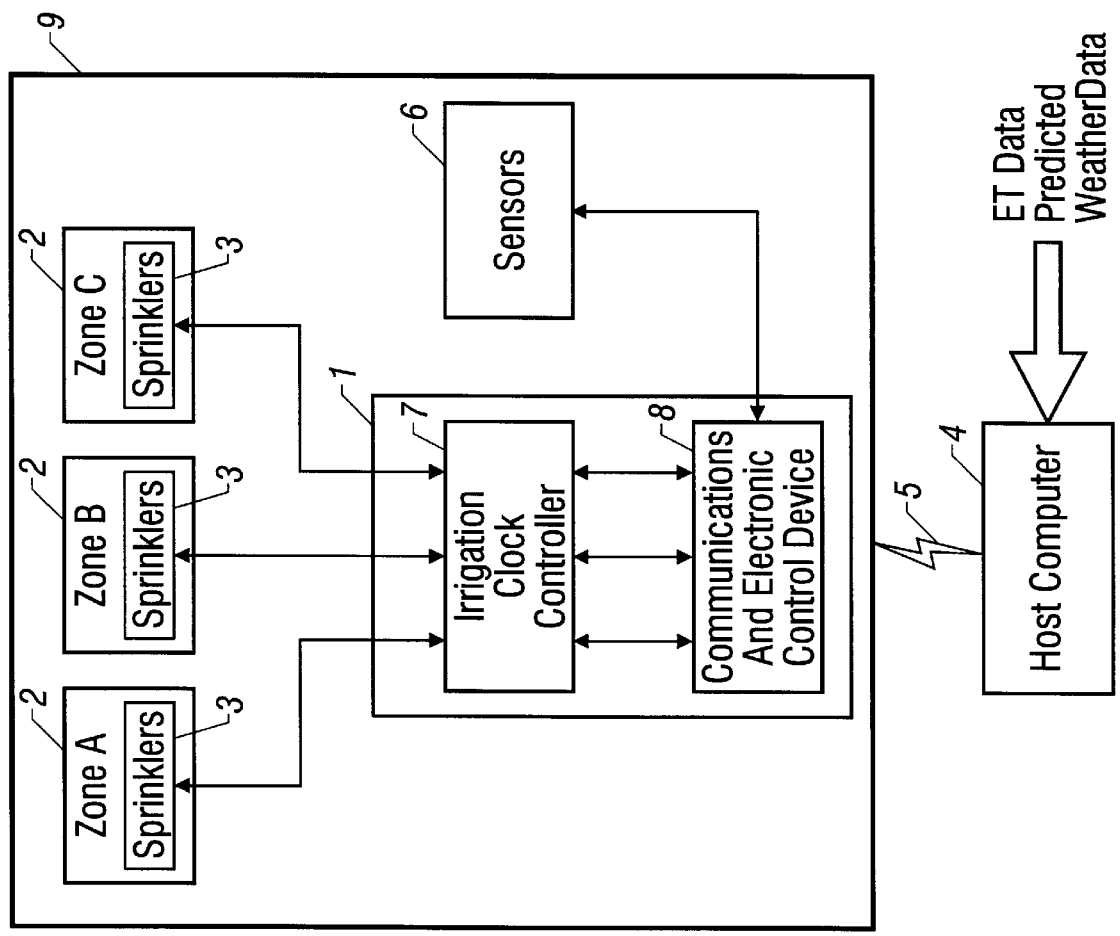
FIG. 8 is a diagram showing an alternative embodiment of an irrigation system in accordance with the present invention, showing a communications and electronic control device at an irrigation site remote from a host computer.

An alternative embodiment of the irrigation control system of the present invention is shown in FIG. 8. In this embodiment, some of the control functions and computations are performed at the host computer 4, while others are performed at the site computer 1. (In this embodiment, the site computer will be referred to, instead, as site control devices 1.) Site control devices 1 are located at an irrigation site 9 and are separated into two elements, a clock controller 7 and a communications and electronic control device 8. The clock controller 7 is a standard irrigation clock controller, in known fashion. Both the clock controller 7 and the communications and control device 8 are coupled together to provide control of a plurality of irrigation zones 2 having at least one irrigation or sprinkler system 3. An irrigation site 9 comprises at least one clock controller 7 and one irrigation zone 2, which uses sprinklers to provide landscape watering of the soil and plants.

In the system illustrated in FIG. 6, specific coefficients and site characteristics data (e.g., vegetation type, soil type, root depth, microclimate, etc.) for the irrigation zones 2 are stored at the host computer 4 for computation of watering schedules. In contrast, the system of FIG. 8 illustrates reference watering schedules using specific coefficients of the site characteristic data that are not likely to change over time based on a reference variable are precomputed and stored at the clock controller 7 for each zone 2.

The data received by the communications and electronic control device 8 from the host computer 4, as shown in FIG. 8, is used to adjust the reference watering schedules stored at the clock controller 7. This can be accomplished by interrupting the current flow between the clock controllers 7 and each irrigation solenoid valve. In the preferred embodiment, the clock controllers' 7 reference watering schedules may also be sent from each communications and control device 8 to the host computer 4. The host computer 4 then computes a factor or amount of change ("watering factor") between each reference schedule and a new schedule, which is based upon meteorological data, including future ETo and/or forecasted precipitation data. Accordingly, the watering factor can be based on either future forecasted ETo data or precipitation data, which data may be predictions of future conditions based on current information. Alternatively, the watering factor may be based on both such ETo and precipitation data. The host computer 4 makes corrective adjustments to the watering factor when historical and current weather measurements show a difference between the forecasted versus actual ETo and/or precipitation factor values. As each day becomes past or historical, adjustments to the reference soil depletion and associated ETo factor is made. Adjustments may also be made to the precipitation factor, if desired. Such data may be obtained from local area weather stations, the National Weather Service, or any other available weather station data needed to calculate the ETo and/or precipitation factors. The watering factor may be expressed as a percent change or as minutes of watering to apply or withhold.

The watering factor may also be computed based on meteorological and other data measured at an irrigation site 9, creating a "closed loop" system. The site controller may include sensors 6 that are used at the irrigation site 9 to monitor and measure various meteorological data, such as wind speed, wind direction, humidity, solar radiation, temperature, and rainfall, and to input this data into the communications and control device 8. Other sensor inputs for the communications and control device 8 may include rain shut off devices, rain gauges, soil moisture sensors, flow rate sensors, water pressure sensors, and current and/or voltage levels of the sprinkler valves 3 that are controlled by the communications and control device 8 to determine operational status. Any or all of this data may be sent from the communications and control device 8 to the host computer 4, which then uses the data in computing the watering factor. Conversely, any or all of this data may be used directly by the communications and control device 8 to adjust the watering factor received from the host computer prior to modifying the reference watering schedule. This results in a potentially more accurate irrigation control system, because the watering factor takes into account not only data collected at the host computer 4, but also more specific and pertinent data from each irrigation site 9.

A watering factor may be computed for each irrigation site 9 or for each zone 2 at each irrigation site 9, or a single watering factor may be determined for all of the irrigation sites. The latter alternative is least attractive, as it fails to account for variations at each irrigation site 9. By using a more universal watering factor for a specific set of sites in the same or similar climatic area, however, a more cost-effective electronic delivery of the new watering schedules can be implemented. Conversely, the most attractive alternative, in terms of precise scheduling, is to calculate a separate watering factor for each zone 2 based on a reference watering schedule corresponding to each zone 2, and, even more accurately, also based on data obtained from sensors 6 at each irrigation site 9.

Once computed, the watering factor(s) are sent to the communications and control device 8 from the host computer 4 using a selected communications method 5, which will be described in more detail below. The communications and control device 8 stores the watering factor data received from the host computer 4 and may also store site derived inputs (such as operational times, duration of watering cycles, etc.) received from the clock controller 7 for each irrigation valve and may also store sensor input data. When a new watering factor is sent to the communications and control device 8, the watering factor is used to adjust the existing watering schedule for each zone 2 by interrupting the watering amounts that are programmed in the clock controller 7 that are called the reference watering schedules. In an alternative embodiment, the watering factor can be used to increase the watering amounts programmed in the clock controller 7 by means of the reference watering schedules.

The connections between the standard irrigation clock controller 7 and the communications and electronic control device 8 may consist of wiring, connections for each irrigation valve, power, and common wire(s). Individual wires from each valve connection on the clock controller 7 would be used to sense whether an individual valve is active or not. This information is then stored on the communication and electronic control device 8 for later use. In addition, wires that connect power between the clock controller 7 and the communication and electronic control device 8 could be used. The common wire(s) would be reconnected on the clock controller 7, such that the common wire of the communication and electronic control device 8 is in series with the clock controller 7 and the sprinkler valve 3 common wire(s). By allowing the communication and electronic control device 8 to interrupt the current flow between the clock controller 7 and the sprinkler valve 3, the actual amount of water applied can be adjusted.

Figure 9:
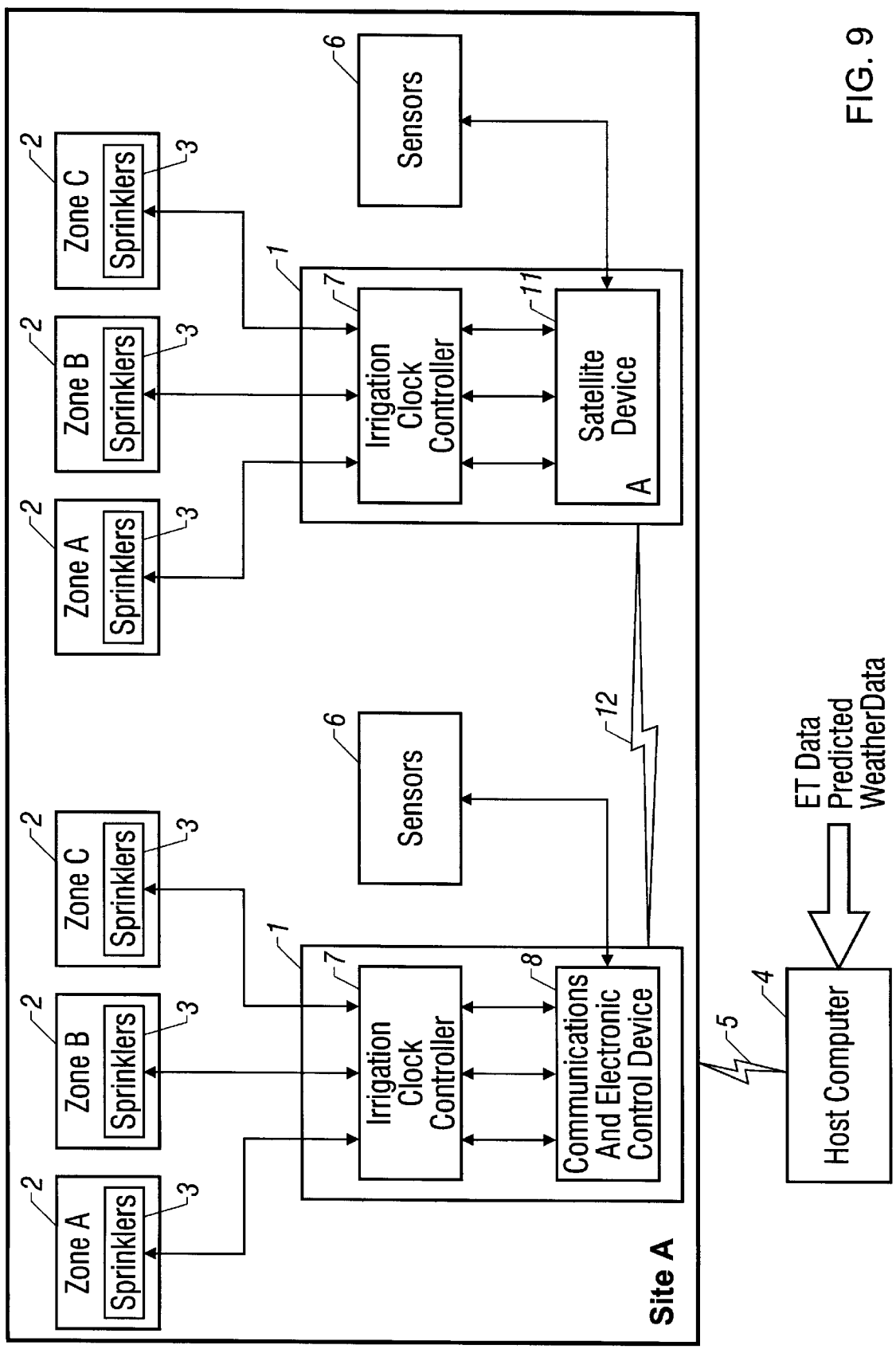
FIG. 9 is a diagram showing an alternative embodiment of the irrigation control system shown in FIG. 8, which provides for a satellite device communicating to the communications and electronic control device.

As shown in FIG. 9, each communications and electronic control device 8, in addition to communicating with a remote host computer 4, may also communicate with one or more satellite controllers 11. A satellite controller 11 may have similar electronic and communications capability to that of the communications and electronic control device 8. A satellite controller 11 can be connected to any irrigation clock controller 7 located at the same site and update irrigation watering schedules according to watering factors received from the communications and electronic control device 8, as illustrated in FIG. 9. Communications methods 12 between the communications and electronic control device 8 and one or more satellite devices 11 can be through direct wire connection, wireless communications, fiber optics, power line, telephone line, infrared, or any other present or future method or means of communicating data from one nearby location to another. Satellite controllers 11 may also communicate with other satellite controllers 11 for passing data from the communications and electronic control device 8. Any desired communications protocol can be used with any selected communications method 12.

Figure 10:
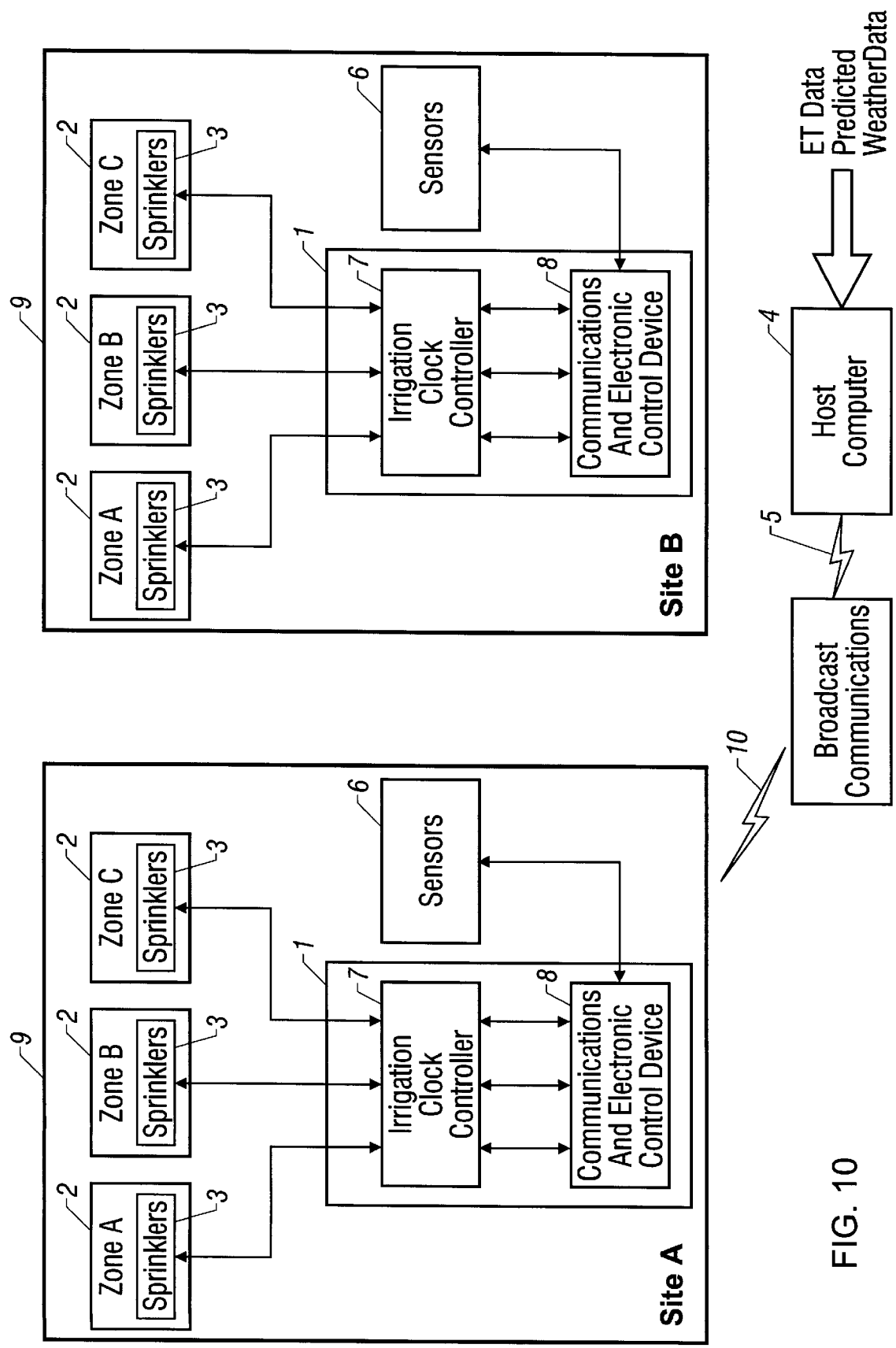
FIG. 10 is a diagram showing another embodiment of the irrigation control system shown in FIG. 8, which incorporates broadcasting of data from the host computer to one or more communications and control devices.

In the system illustrated in FIG. 10, the host computer 4, which can be located at a different or remote location from the irrigation site 9, can send modified watering factors to more than one communications and control device 8 at the same time using a combination of any selected communications method 5 and any selected broadcasting method 10. Broadcasting the watering factors to an irrigation site 9 within similar climatic zones provides for irrigation control of a plurality of irrigation sites 9. The broadcasted factors can be encoded with site specific information and the communication and control device 8 can be addressable. With addressing capability, the communications and control device 8 can select a part of the data being broadcasted which is specific to that particular site. The communication and control device 8 can be set up with a specific climate factor to account for certain site specific characteristics, such as microclimate conditions. One or both of these methods may be used to account for site specific characteristics in scheduling irrigation watering.

Any convenient method can be used to communicate data between the host computer 4 (through a broadcast communications link) and the communications and control device 8. Such methods can be used to communicate data either to one or to a plurality of irrigation sites 9. Illustrative communications methods include both wire and wireless methods. Suitable wire methods include telephone lines, coaxial cables, TV cables, fiber optics, etc. Suitable wireless methods include radio stations, satellite, and microwave, and can be performed at all frequencies throughout a spectrum in which data or information can be sent and/or received. One or more of the wire or wireless methods can be used in combination or in part to form a data transmission path between the host computer 4 and the irrigation sites 9.

The features shown in FIGS. 9 and 10 can also be combined, so that broadcast data can be received by a master site A and passed to nearby sites via a local communications method 12 (e.g., land line).

The encoding of data can be implemented for transmission or reception of data via wire or wireless methods. Some examples of suitable data encoding for transmission or reception via wire or wireless methods include standard modems, frequency key shifting over cable broadcast frequencies, digital fiber optics, embedded data in the vertical blanking interval of video broadcasts, etc. Data can also be encrypted for security during the transmissions and decrypted by the communications and control device 8.

Using Forecast Data

The following describes a procedure, preferably implemented as a computer program stored on a storage media or device readable by a computer, for configuring and operating the computer when the storage media or device is read by the computer. The computer may be operated to determine soil moisture depletion and watering schedules in accordance with the present invention. The part of the procedure described below begins at the point of determining how much and when to water.

Figure 7:
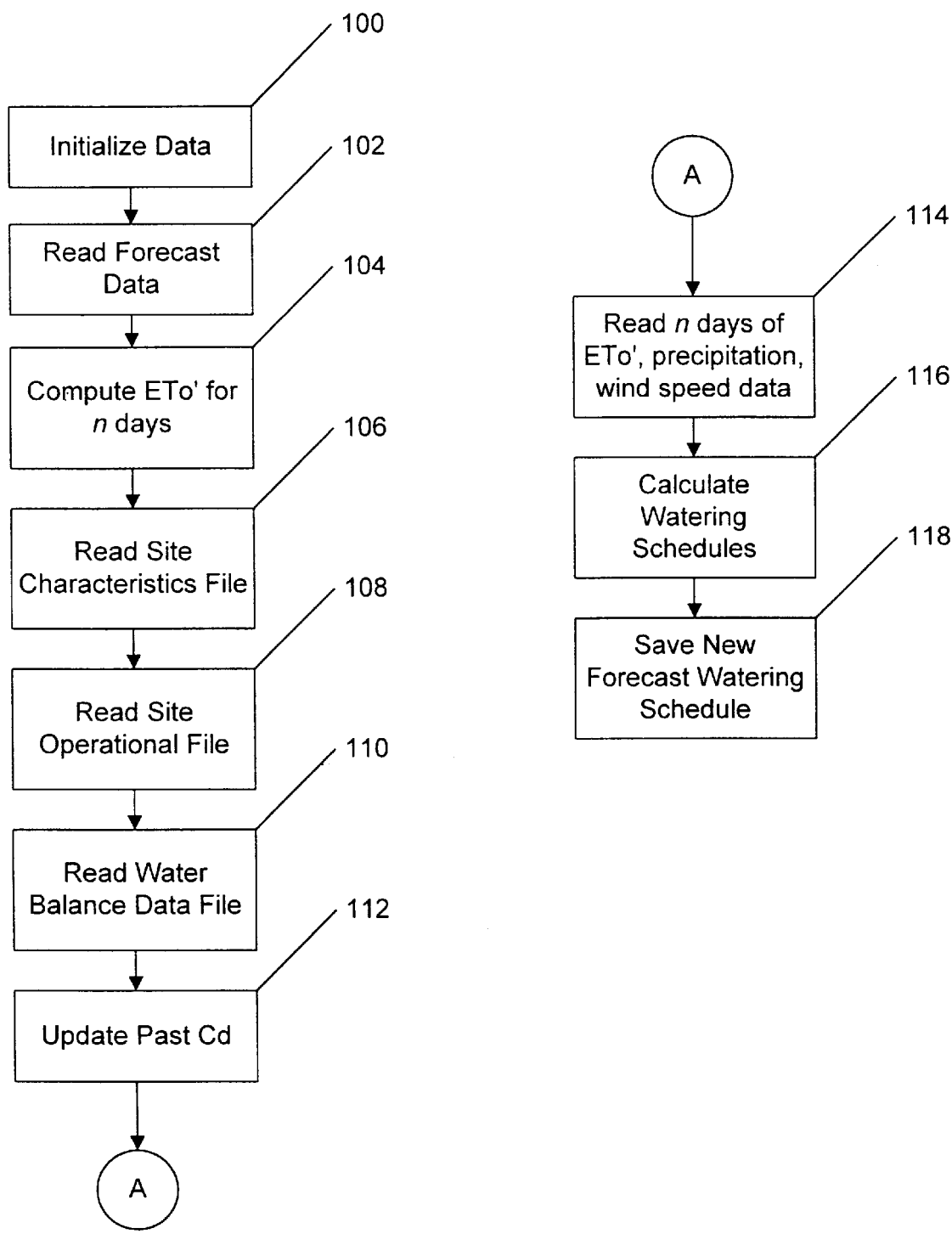
FIG. 7 is a flowchart of a preferred embodiment of the inventive procedure.
Figure 11:
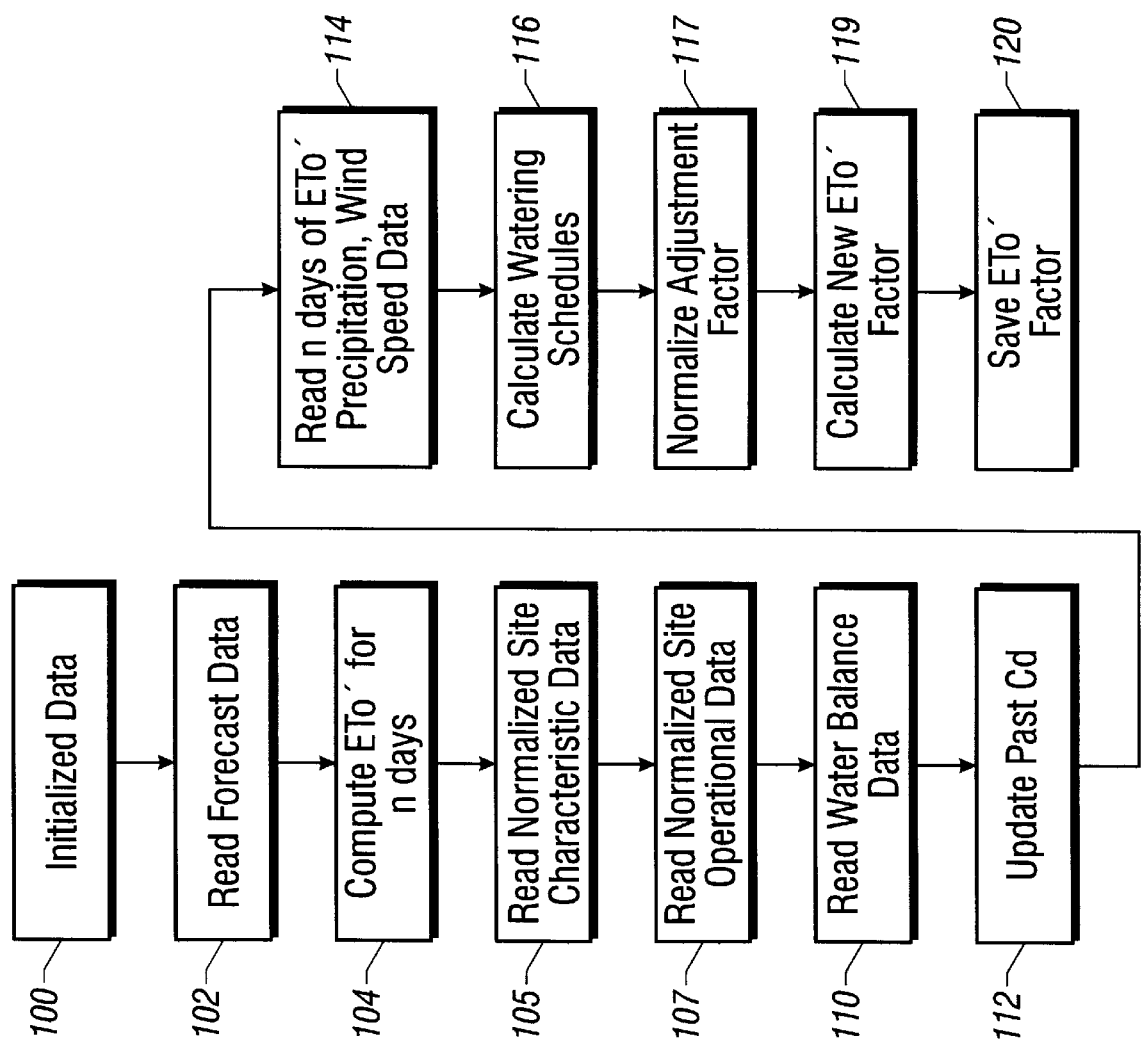
FIG. 11 is a flowchart of an alternative embodiment of the inventive procedure.

At least two alternative embodiments of the above procedure can be used in accordance with the present invention. The first is illustrated in FIG. 7 and corresponds to the irrigation system of FIG. 6. The second is illustrated in FIG. 11 and corresponds to any one of the irrigation systems shown in FIGS. 8–10. Both procedures are described in detail below.

The following definitions are used in conjunction with the described procedures and the flowcharts shown in FIGS. 7 and 11:

ET Evapotranspiration

ETo Evapotranspiration normalized for 4"–6" tall cool-season grass.

Kc Average crop coefficient (per valve)

Kd Density coefficient (per valve)

Kmc Micro-climate coefficient (per valve)

Kadj Stress adjustment coefficient (per valve)

Dd Daily depletion of moisture in the soil (per valve)

Di Irrigation deficiency level of moisture in the soil before irrigation required Du Distribution uniformity of coverage of applying water to turf or plant area Rapp Rate of application of water Napp Net application amount of water applied Ieff Effective irrigation of applied water for entire system Cd Cumulative depletion of moisture in the soil In calculating watering schedules based upon future ETo or forecasted precipitation, both fixed and variable parameters exist in the ET formulas. A fixed parameter can be defined as a parameter that, once determined, will not change under normal conditions. Examples of fixed parameters are the site characteristics such as Kd, Kmc, Kadj, Di, Rapp, Du, and Ieff. A variable parameter can be defined as a parameter that has the potential to change under normal conditions and on a regular basis. Examples of variable parameters are ET and Dd, daily depletion of moisture in the soil.

Variable parameters can be historical weather data for a given day or forecasted ETo and precipitation data for future days. Variable parameters can be used to calculate adjustment factors using the same ET formulas used to calculate the reference watering schedule. Calculated adjustment factors (e.g., watering factors) can then be used to update the reference watering schedule previously calculated using the fixed parameters and reference parameters.

In the procedure and flowchart of FIG. 7 for configuring and operating the computer, all parameters are stored at the host computer 4 each time forecasted conditions are used to control water usage. The procedure of FIG. 7 comprises the following steps:

1. Initialize program data (STEP 100)
2. Read forecast data from meteorological data file (STEP 102)
3. Compute n days of forecasted ETo (defined here as ETo') from forecast meteorological data and store in meteorological data file {see further description below on computing ETo'} (STEP 104)
4. Read site characteristics file {see description below of .STQ file} (STEP 106)
5. Read current site operational file {see description below of .ST0 file} (STEP 108)
6. Read water balance data file for site, to get past Cd {see description below of .BAL files} (STEP 110)
7. Update past Cd to account for water applied during past watering schedules, from last time site was updated to present date (STEP 112)
8. Read n days of ETo' and precipitation and wind speed data from meteorological data file (STEP 114)
9. Calculate watering schedules for all site valves (STEP 116), as follows:
   (a) Loop on next n days
   (b) Loop on site valves (i.e., zones)
   (c) Calculate daily depletion: Dd=ETo'×Kc×Kd×Kmc×Kadj {Note-Kadj can be used as a further decrease in water use required by regulatory agencies}
   (d) Subtract effective precipitation {from forecasted weather data} from Dd (e) Add new Dd to current Cd for day n to determine new cumulative depletion, Cd
(f) Check if new Cd>Di, the irrigation deficiency level (If NO, no watering required; loop to next valve)
(g) Check if watering allowed for current day (If NO, loop to next valve)
(h) Block out for individual days {e.g., mowing days, "Just don't" days} for schedule period {e.g., Sunday to Saturday}
(i) Block out for pattern days {e.g., odd/even days}
(j) Block out days for which predicted wind speed exceeds preset limit
(k) Calculate amount of time (rounded to nearest minute) to apply the total amount of water, Cd, as: Time=Cd/(Rapp×Ieff)
(I) Check maximum time (MaxTime) allowed for valve; if MaxTime is exceeded, split Time into multiple watering intervals separated by a precalculated WaitTime between intervals
(m) Save number of minutes of water applied for irrigation (MaxTime×number of watering cycles) as the net application (Napp) amount
(n) Subtract Napp from Cd to get final Cd for current day
(o) Save Cd for next day's calculation
(p) End valve loop
(q) End day loop 10. Save new forecast watering schedule to water balance file for next update of watering schedule {see description of .BAL file below} (STEP 118)

In the alternative procedure and flowchart of FIG. 11, the host computer 4 computes the ETo adjustment factor when the fixed parameters (such as Kd, Kmc, Kadj, Di, Rapp, and Ieff) are determined at the irrigation sites 9. As a consequence, optimum watering scheduling factors can be computed without all parameters being stored at the host computer 4, as in the procedure of FIG. 7, each time forecasted weather conditions are used to control irrigation. In the following description of FIG. 11, because the first 3 steps in FIGS. 7 and 11 (i.e., Steps 100, 102, and 104) are identical in order and content, only the remaining steps will be set forth:

(4) Read normalized site characteristics data The normalized site specific data could represent a typical average site for a given climatic area. In order to normalize this predefined site specific data, a maximum depletion value per day is assumed at the host computer for a given climatic area. In addition, any site characteristic data that is to be set at the site controller location can be set to a normalized value (such as 1.0). It should be obvious that the host computer can use the same algorithms when using normalized site characteristic data or the normal site characteristic data. (STEP 105)

(5) Read normalized site operational data. The normalized site operational data could represent a typical average site for a given climatic area. It should be obvious that the host computer can use the same algorithms when using normalized site operational data or the normal site operational data. (STEP 107)

(6) Read water balance data file for site, to get past Cd {see description below of .BAL files} (STEP 110)

(7) Update past Cd to account for water applied during past watering schedules, from last time site was updated to present date (STEP 112)

(8) Read n days of ETo' and precipitation and wind speed data from meteorological data file (STEP 114)

(9) Calculate watering schedules for all site valves (STEP 116'), as follows:
(a) Loop on next n days
(b) Loop on site valves (i.e., zones)
(c) Calculate Dd (daily depletion) using ETo, Kc, and normalized Kd, Kmc, Kadj values; Thus:

$$Dd=(ETo)(Kc)(Kd)(Kmc)(Kadj)$$

{Note-Kadj can be used as a further decrease in water use required by regulatory agencies}
(d) Subtract effective precipitation {from forecasted weather data} from Dd
(e) Add new Dd to current Cd for day n to determine new cumulative depletion, Cd
(f) Calculate net amount of water to apply (Napp) using Cd and normalized Rapp, Ieff values.

$$NTime=Cd/(Rapp*Ieff)$$

If (Cd>Di) then Napp=Rapp*NTime*Ieff
(g) Save Napp
(h) Subtract Napp from Cd to get final Cd for current day
(i) Save Cd for next day's calculation
(j) End valve loop
(k) End day loop

(10) Normalized adjustment factor=current Napp/reference Napp (STEP 117) where:
Current Napp is defined as the actual amQunt of water required representative for a site zone (e.g., Zone A 2) for a given day. Reference Napp is defined as the amount of water required for baseline conditions representative for a site zone (e.g., Zone A 2).

(11) Calculate new ETo factor (ETo') (STEP 119)

(12) Save ETo' factor to water balance file for next update of watering schedule {see description of .BAL file below} (STEP 120)

The above procedures of FIGS. 7 and 11 may be altered in sequence and by using other factors (e.g., moisture sensor data, etc.) to achieve substantially the same result: computation of a watering schedule for the valves of each site that takes into account predicted weather conditions, such that irrigation water usage is substantially reduced.

Calculation of Forecast ETo'

The following sets forth inputs to a standard math worksheet, and accompanying equations and logic, for computation of ETo' for one hour in the future, based upon predicted weather data. The technique may be extrapolated to longer time periods. In general, a number of methods (such as the well-known Penman formula) exist for calculating ETo. These methods can be used in conjunction with the present invention by inputting predicted weather conditions (rather than past conditions) to calculate ETo'.

ETo calculations for 1 hour example

| | |
|---|---|
| $Rn := 293.304$ | Net radiation (W/m^2) |
| $T := 294.33$ | Air temperature (degK) |
| $VPa := 1.249$ | Vapor pressure (kPa) |
| $U := 2.46$ | Wind speed (m/sec) |
| $P := 100.$ | Barometric pressure (kPa) |

(1) Saturation vapor pressure for a given air temperature

-continued $$x := -7.90298 \cdot \left(\frac{373.16}{T} - 1\right) + 5.02808 \cdot \log\left(\frac{373.16}{T}\right) -$$
$$1.3816 \cdot 10^{-7} \cdot [10^{11.344 \cdot (1-\frac{T}{373.16})} - 1] \ldots +$$
$$8.1328 \cdot 10^{-3} \cdot [10^{-3.49149 \cdot (\frac{373.16}{T} - 1)} - 1] + 2.0057$$

$$VPsa := 10^x$$

(2) Vapor Pressure deficit $$VPD := VPsa - VPa$$

(3) DEL = The slope of the saturation vapor pressure versus air temperature curve at the hourly air temperature $$DEL := \left[\frac{(6790.5 - 5.02808 \cdot T) + 4916.8 \cdot 10^{(-.0304 \cdot T)} \cdot T^2 \ldots +}{174209 \cdot 10^{(-\frac{1302.88}{T})}}\right] \cdot \frac{VPsa}{T^2}$$

(4) Calculate GAM $$GAM := .000646 \cdot (1 + .000946 \cdot (T - 273.16)) \cdot P$$

(5) W = Humidity function $$W := \frac{DEL}{DEL + GAM}$$

(6) FU = Wind function

For night time with $Rn <= 0$ $$FU_1 := .125 + .0439 \cdot U$$

For daytime with $Rn > 0$ $$FU_2 := .03 + .0576 \cdot U$$

$$FU := if(Rn>0, FU_2, FU_1)$$

(7) Convert Rn from (W/m^2) to mm

-continued $$Rmm := \frac{Rn}{(694.5 \cdot (1 - .000946 \cdot (T - 273.16)))}$$

(8) Hourly ETo' is approximately equal to RET (mm)

$$ETo_{hourly} := Rmm \cdot W + (1 - W) \cdot VPD \cdot FU$$

$$ETo_{hourly} = 0.367$$

Site characteristics file .STQ

The .STQ file is used to store specific information on when and how much to water for each valve. The values in this file are derived from empirical observations of relevant site characteristics (type of plants, root depth, slope, etc.) and artificial constraints (e.g., days of week watering allowed). This file is then used to make watering schedule calculations, which in turn are passed to the site computers 1 for updating of valve schedules. In the preferred embodiment of the present invention, the .STQ file has the following format:

(1) Valve ID
(2) Kc
(3) Kd
(4) Kmc
(5) Kadj
(6) Di
(7) Rapp
(8) Du
(9) Ieff
(10) MaxTime—the maximum time per watering cycle
(11) WaitTime—the wait time between watering cycles
(12) Type of watering schedule to use
(13) Days of week allowed to water Using one sprinkler valve as an example, the values in the .STQ file are set forth below as inputs to a standard math worksheet and as accompanying equations and logic.

| INITIAL INPUTS | [Note that classifications are generally arbitrary] |
|---|---|
| Valveid := 5 | Valve id number; range is: m := 1 . . . 8 |
| SprinklerType := 2 | Type of sprinkler |
| | 1 = Spray, 2 = Impact, 3 = Stream spray, 4 = Stream rotor, 5 = Drip |
| PlantType := 4 | Type of plants |
| | 1 = Low, Drought tolerant (.2) |
| | 2 = Med, Average (.8) |
| | 3 = High, Tropical, moist conditions (1.0) |
| | 4 = Cool season grass (.8) |
| | 5 = Warm season grass (.6) |
| | 6 = Ground cover (.8) |
| | 7 = Shrubs (.5) |
| | 8 = Color (.7) |
| Kc := 0.00 | Crop coefficient [calculated in accordance with the prior art] |
| PlantDensity := 2 | Type of Vegatation density |
| | 1 = Low, new plantings |
| | 2 = Med, Average |
| | 3 = High, Jungle like |
| Kd := 0.00 | Density coefficient |
| Microclimate := 3 | Type of microclimate |
| | 1 = Low, protected, full shade |
| | 2 = Slighty Low, partial shade |
| | 3 = Med, average |
| | 4 = Slightly High, Parklike area |
| | 5 = High, Middle parking lot, slope on wind |
| Kmc := 0.0 | Microclimate coefficient |

-continued

| | | |
|---|---|---|
| Kadj := 0.80 | Adjustment coefficient | |
| Wamount := 0 | Water meter amount (cubic ft) | |
| Wtime := 0 | Water meter time on (minutes) | |
| Qgpm := 87 | Flow amount (gpm) | |
| Area := 16500 | Area (square ft) | |
| Du := 0.60 | Distribution uniformity factor | |
| Ieff := 0.75 | Irrigation efficiency factor | |
| SoilType := 2 | Type of soil | |
| | 1 = Sandy clay loam, clay loam, silty clay loam | |
| | 2 = v. fine sandy loam, loam, silt loam, sandy clay, silty clay, clay | |
| | 3 = loamy fine sand, sandy loam, fine sandy loam | |
| | 4 = Sand, fine sand, loamy coarse sand | |
| | 5 = gravelly, coarse sand | |
| RootDepth := 6 | Root depth (inches) | |
| Terrain := 1 | Grade of slope | |
| | 1 = 0–4% grade | |
| | 2 = 4–8% grade | |
| | 3 = 8–12% grade | |
| | 4 = 12–16% grade | |
| | 5 = >16% grade | |
| MaxWater := 40 | Maximum watering time per day per valve (minutes) | |

CALCULATIONS (1) Crop coefficient  
    PlantType = 4  
    Kc := if(Kc > 0,Kc,Kcrop$_{PlantType}$)*  
    Kc = 0.8  
    *i.e., if Kc is greater than zero, set Kc = Kc, otherwise set  
    Kc = Kcrop$_{PlantType}$ = Kcrop$_4$ = .8  
    [Note that Kcrop$_m$ is an array indexed by PlantType to get a weighting factor]

Kcrop$_m$ :=
.2
.8
1.0
.8
.6
.8
.5
.7

(2) Density coefficient  
    PlantDensity = 2  
    Kd := if(Kd > 0,Kd,Kdensity$_{PlantDensity}$)  
    Kd = 1

Kdensity$_m$ :=
.6
1.0
1.3

(3) Microclimate coefficient  
    Microclimate = 3  
    Kmc := if(Kmc > 0,Kmc,Kmicroclimate$_{Microclimate}$)  
    Kmc = 1

Kmicroclimate$_m$ :=
.5
.75
1.0
1.2
1.4

(4) Calculate average precipitation rate (in/hr)

$$Qgpm := if\left(Qgpm > 0, Qgpm, \frac{Wamount \cdot 7.48}{Wtime}\right)$$

$$Rapp := Qgpm \cdot \frac{96.3}{Area}$$

Rapp = 0.508

(5) Estimate the soil moisture holding capacity (in/in)  
    i := SoilType  
    SoilHold := SoilMoisture$_i$  
    SoilHold := 0.146  
    RootZone := RootDepth SoilHold  
    RootZone := 0.876

SoilMoisture$_m$ :=
.175
.146
.104
.073
0.48

(6) Calculate soil moisture deficient before watering (in)  
    Start with maximum allowed deficient (30%)  
    RootFraction := .30  
    If soil type is sandy, less water more frequently  
    RootFraction := if(SoilType > 3,.20,RootFraction)  
    RootFraction := if(SoilType > 4,.15,RootFraction)  
    Di := RootZone · RootFraction  
    Di = 0.263

(7) Calculate the maximum watering time per cycle allowed (mins)  
    First calculation using soil type and slope of grade  
    i := SoilType    i = 2  
    j := Terrain    j = 1  
    Sfact := if(SoilType = 1,I1$_j$,.10)  
    Sfact := if(SoilType = 2,I2$_j$,Sfact)  
    Sfact := if(SoilType = 3,I3$_j$,Sfact)  
    Sfact := if(SoilType = 4,I4$_j$,Sfact)  
    Sfact := if(SoilType = 5,I5$_j$,Sfact)    Sfact 0.19

(SoilType (I1–I5) vs Terrain)

| I1$_m$ := | I2$_m$ := | I3$_m$ := | I4$_m$ := | I5$_m$ := |
|---|---|---|---|---|
| .13 | .19 | .50 | .75 | .94 |
| .10 | .15 | .40 | .60 | .75 |
| .08 | .11 | .30 | .45 | .56 |
| .05 | .08 | .20 | .30 | .38 |
| .03 | .05 | .13 | .19 | .24 |

$$MaxTime := \frac{Sfact}{Rapp} \cdot 60$$

Next, check Sprinkler type  
MaxTime := if(SprinklerType = 2,MaxTime · 2.0,MaxTime)  
MaxTime := if(SprinklerType = 3,MaxTime · 1.5,MaxTime)

-continued

```
    MaxTime := if(SprinklerType = 4,MaxTime · 1.5,MaxTime)
    MaxTime := if(SprinklerType = 5,MaxTime · 5.0,MaxTime)
    MaxTime := if(MaxTime < 2,2,MaxTime)  MaxTime = 44.903
    MaxTime := floor(MaxTime)    MaxTime = 44
(8) Calculate the waiting time between cycles (mins)
    Start at 32 minutes minimum and increase as slope increases
    WaitTime := 32 + (Terrain·8)    WaitTime = 40
(9) Check that maximum watering time/day is not exceeded
    Total time required to apply Di amount of water (mins)
    Di = 0.263
```

$$\text{TotalTime} := \frac{Di}{\left(\frac{Rapp}{60.} \cdot \text{Ieff}\right)} \qquad \text{TotalTime} = 41.405$$

$$\text{Dimax} := \text{MaxWater} \cdot \left(\frac{Rapp}{60.} \cdot \text{Ieff}\right) \qquad \text{Dimax} = 0.254$$

```
    Di := if(Di > Dimax,Dimax,Di)
    Di = 0.254
```

Thus, in this example the following inputs:

Valveid = 5
SprinklerType = 2
PlantType = 4
PlantDensity = 2
RootDepth = 6
SoilType = 2
Microclimate = 3
Terrain = 1
Area = $1.65 \cdot 10^4$
Qgpm = 87
Wamount = 0
Wtime = 0
SoilHold = 0.146
RootZone = 0.876
RootFraction = 0.3
result in the following outputs:
(English units)

Kc = 0.8
Kd = 1
Kmc = 1
Kadj = 0.8
Di = 0.254
Rapp = 0.508
Du = 0.6
Ieff = 0.75
MaxTime = 44
WaitTime = 40
Total time required to apply Di amount of water (mins)

$$\text{TotalTime} := \frac{Di}{\left(\frac{Rapp}{60.} \cdot \text{Ieff}\right)} \qquad \text{TotalTime} = 40$$

Site characteristics file .STO

An .STO data file stores the current watering schedule for each site computer 1. After the host computer 4 determines when and how much to water, the watering scheduling information is then passed to the site computer 1. The site computer 1 then uses this new information for the watering schedule. In the preferred embodiment of the present invention, each STO file has the following format:

(1) Schedule program—each program contains the following information:
(2) Run line—a number indicating membership in a set of valves which may be operated concurrently (e.g., run line # 1 might be valves 1, 3, and 5 out of 6 valves; the grouping need not be constant, but may change from watering period to watering period)
(3) Start Time
(4) Wait Time
(5) Schedule program to run for each valve
(6) Total time to water for each valve
(7) Number of cycles for each valve
(8) Days to water for each valve Example of a Water Balance BAL File for a Valve A water balance file is used to track the moisture content of the soil from day to day. The cumulative depletion level (Cd) is the current moisture content of the soil. As moisture evaporates from the soil, the cumulative depletion level increases. When precipitation or watering by irrigation occurs, the moisture level of the soil increases and the cumulative depletion value decreases. In the preferred embodiment of the present invention, each .BAL file has the following format:

(1) Valve number
(2) Date
(3) ETo Normalized ET value for the day
(4) Kc ET crop coefficient (5) ETo' Final ET value to be used for calculating amount of water depleted for day
(6) Dd Daily depletion
(7) Da Accumulated depletion (past Cd+Dd)
(8) P Actual precipitation
(9) R Effective amount of total precipitation that can be used
(10) Napp Net application amount of water applied
(11) Cd Cumulative depletion for day
(12) Time Total time to water for day
(13) Intvl Number of cycles (intervals)

Example of Watering Schedules for a Year

Following are two examples of watering schedules for a year, wherein the watering schedule was generated every few days. The first schedule shows the actual days and the total time watered for a single valve at a site when no rain is predicted. The second schedule shows the actual days and the total time watered for a single valve at a site when rain is predicted and taken into account in accordance with the present invention.

Watering times (minutes) - No Rain Predicted

| Day | Jan | Feb | Mar | Apr | May | Jun | Jul | Aug | Sep | Oct | Nov | Dec |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 0 | 0 | 0 | 0 | 0 | 0 | 24 | 24 | 0 | 0 | 0 | 0 |
| 3 | 0 | 0 | 0 | 0 | 24 | 0 | 0 | 0 | 0 | 0 | 18 | 0 |
| 4 | 0 | 0 | 0 | 0 | 0 | 0 | 0 | 0 | 0 | 0 | 0 | 0 |
| 5 | 0 | 0 | 0 | 30 | 0 | 0 | 0 | 0 | 0 | 0 | 0 | 0 |
| 6 | 0 | 0 | 0 | 0 | 24 | 0 | 0 | 0 | 0 | 0 | 0 | 0 |
| 7 | 0 | 0 | 0 | 0 | 0 | 0 | 0 | 0 | 0 | 0 | 0 | 0 |
| 8 | 0 | 0 | 0 | 0 | 18 | 0 | 0 | 0 | 0 | 0 | 0 | 0 |
| 9 | 0 | 0 | 0 | 0 | 0 | 0 | 0 | 0 | 0 | 0 | 0 | 0 |
| 10 | 0 | 0 | 0 | 24 | 24 | 24 | 0 | 0 | 0 | 0 | 0 | 0 |
| 11 | 0 | 0 | 0 | 0 | 0 | 0 | 0 | 0 | 24 | 0 | 0 | 0 |
| 12 | 0 | 0 | 18 | 18 | 0 | 0 | 24 | 0 | 0 | 0 | 0 | 0 |
| 13 | 0 | 0 | 0 | 0 | 18 | 0 | 0 | 0 | 0 | 0 | 0 | 0 |
| 14 | 0 | 0 | 0 | 0 | 0 | 0 | 24 | 0 | 0 | 0 | 0 | 0 |
| 15 | 0 | 0 | 0 | 24 | 18 | 0 | 0 | 0 | 18 | 0 | 0 | 0 |
| 16 | 0 | 0 | 0 | 0 | 0 | 30 | 0 | 30 | 0 | 0 | 0 | 0 |
| 17 | 0 | 0 | 0 | 0 | 18 | 0 | 18 | 0 | 0 | 0 | 0 | 0 |
| 18 | 0 | 0 | 0 | 0 | 0 | 0 | 0 | 18 | 0 | 0 | 0 | 0 |
| 19 | 0 | 0 | 0 | 0 | 0 | 0 | 24 | 0 | 0 | 0 | 0 | 0 |
| 20 | 0 | 0 | 0 | 0 | 18 | 0 | 0 | 0 | 30 | 0 | 0 | 0 |
| 21 | 0 | 0 | 0 | 18 | 0 | 0 | 18 | 0 | 0 | 0 | 0 | 0 |
| 22 | 0 | 0 | 0 | 0 | 18 | 0 | 0 | 0 | 0 | 0 | 18 | 0 |
| 23 | 0 | 0 | 0 | 0 | 0 | 36 | 24 | 36 | 0 | 18 | 0 | 0 |
| 24 | 0 | 0 | 0 | 0 | 0 | 0 | 0 | 0 | 18 | 0 | 0 | 0 |
| 25 | 0 | 0 | 0 | 0 | 0 | 24 | 0 | 0 | 0 | 0 | 0 | 0 |
| 26 | 0 | 0 | 0 | 30 | 0 | 0 | 30 | 0 | 0 | 0 | 0 | 0 |
| 27 | 0 | 0 | 0 | 0 | 0 | 0 | 0 | 0 | 24 | 0 | 0 | 0 |
| 28 | 0 | 0 | 0 | 18 | 0 | 0 | 0 | 0 | 0 | 18 | 0 | 0 |
| 29 | 0 |  | 0 | 0 | 0 | 0 | 0 | 0 | 0 | 0 | 0 | 0 |
| 30 | 0 |  | 0 | 24 | 0 | 36 | 0 | 24 | 0 | 0 | 0 | 0 |
| 31 | 0 |  | 0 |  | 0 |  | 24 | 0 |  | 0 |  | 0 |
| Mins | 0 | 0 | 18 | 186 | 180 | 150 | 210 | 132 | 114 | 36 | 36 | 0 |
| ETo | 1.16 | 1.55 | 2.90 | 4.40 | 5.07 | 6.65 | 6.60 | 6.20 | 4.75 | 2.74 | 1.93 | 0.91 |
| Days | 0 | 0 | 1 | 8 | 9 | 5 | 9 | 5 | 5 | 2 | 2 | 0 |
| ADBW* | 0.0 | 0.0 | 31.0 | 3.8 | 3.4 | 6.0 | 3.4 | 6.2 | 6.0 | 15.5 | 15.0 | 0.0 |

*ADBW — Average days between waterings
Total ETo inches for year: 44.86
Total time (mins) for year: 1062
Total amount (hcf) for year: 31.9

Watering times (minutes) - Rain Predicted

| Day | Jan | Feb | Mar | Apr | May | Jun | Jul | Aug | Sep | Oct | Nov | Dec |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 18 | 0 | 0 | 0 | 0 | 0 | 18 | 0 |
| 4 | 0 | 0 | 0 | 0 | 0 | 0 | 0 | 0 | 0 | 0 | 0 | 0 |
| 5 | 0 | 0 | 0 | 30 | 18 | 0 | 0 | 0 | 0 | 0 | 0 | 0 |
| 6 | 0 | 0 | 0 | 0 | 0 | 0 | 0 | 0 | 42 | 0 | 0 | 0 |
| 7 | 0 | 0 | 0 | 0 | 18 | 0 | 24 | 0 | 0 | 0 | 0 | 0 |
| 8 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 |
| 10 | 0 | 0 | 0 | 24 | 30 | 0 | 0 | 0 | 0 | 0 | 0 | 0 |
| 11 | 0 | 0 | 0 | 0 | 0 | 0 | 0 | 0 | 0 | 0 | 0 | 0 |
| 12 | 0 | 0 | 0 | 0 | 0 | 0 | 24 | 0 | 0 | 0 | 0 | 0 |
| 13 | 0 | 0 | 0 | 0 | 24 | 0 | 0 | 0 | 24 | 0 | 0 | 0 |
| 14 | 0 | 0 | 0 | 0 | 0 | 0 | 24 | 18 | 0 | 0 | 0 | 0 |

-continued

Watering times (minutes) - Rain Predicted

| Day | Jan | Feb | Mar | Apr | May | Jun | Jul | Aug | Sep | Oct | Nov | Dec |
|---|---|---|---|---|---|---|---|---|---|---|---|---|
| 15 | 0 | 0 | 0 | 0 | 18 | 0 | 0 | 0 | 0 | 0 | 0 | 0 |
| 16 | 0 | 0 | 0 | 0 | 0 | 54 | 0 | 18 | 0 | 0 | 0 | 0 |
| 17 | 0 | 0 | 0 | 0 | 18 | 0 | 18 | 0 | 18 | 0 | 0 | 0 |
| 18 | 0 | 0 | 0 | 0 | 0 | 0 | 0 | 0 | 0 | 0 | 0 | 0 |
| 19 | 0 | 0 | 0 | 0 | 0 | 0 | 24 | 0 | 0 | 0 | 0 | 0 |
| 20 | 0 | 0 | 0 | 0 | 0 | 0 | 0 | 24 | 0 | 0 | 0 | 0 |
| 21 | 0 | 0 | 0 | 30 | 0 | 0 | 18 | 0 | 0 | 0 | 0 | 0 |
| 22 | 0 | 0 | 0 | 0 | 0 | 0 | 0 | 0 | 24 | 0 | 0 | 0 |
| 23 | 0 | 0 | 0 | 0 | 0 | 36 | 24 | 24 | 0 | 18 | 0 | 0 |
| 24 | 0 | 0 | 0 | 0 | 0 | 0 | 0 | 0 | 0 | 0 | 0 | 0 |
| 25 | 0 | 0 | 0 | 0 | 0 | 24 | 0 | 0 | 0 | 0 | 0 | 0 |
| 26 | 0 | 0 | 0 | 24 | 0 | 0 | 0 | 0 | 0 | 0 | 0 | 0 |
| 27 | 0 | 0 | 0 | 0 | 0 | 0 | 0 | 0 | 0 | 0 | 0 | 0 |
| 28 | 0 | 0 | 0 | 24 | 0 | 0 | 0 | 0 | 0 | 18 | 0 | 0 |
| 29 | 0 |  | 0 | 0 | 0 | 0 | 30 | 0 | 0 | 0 | 0 | 0 |
| 30 | 0 |  | 0 | 24 | 0 | 36 | 0 | 0 | 0 | 0 | 0 | 0 |
| 31 | 0 |  | 0 |  | 0 |  | 24 | 0 |  | 0 |  | 0 |
| Mins | 0 | 0 | 0 | 156 | 144 | 150 | 210 | 84 | 108 | 36 | 18 | 0 |
| ETo | 1.16 | 1.55 | 2.90 | 4.40 | 5.07 | 6.65 | 6.60 | 6.20 | 4.75 | 2.74 | 1.93 | 0.91 |
| Days | 0 | 0 | 0 | 6 | 7 | 4 | 9 | 4 | 4 | 2 | 1 | 0 |
| ADBW* | 0.0 | 0.0 | 0.0 | 5.0 | 4.4 | 7.5 | 3.4 | 7.8 | 7.5 | 15.5 | 30.0 | 0.0 |

*ADBW — Average days between waterings
Total ETo inches for year: 44.86
Total time (mins) for year: 906
Total amount (hcf) for year: 27.2

Thus, when predicted rain is not taken into account, the total number of minutes of irrigation applied during the year is 1,062. In this example, this number of minutes at an application rate of 22.44 gpm means that 31.9 hcf of water would be applied.

In contrast, in the second example, where predicted rain is taken into account, the total number of minutes of irrigation applied during the year is 906. In this example, this number of minutes at an application rate of 22.44 gpm means that 27.2 hcf of water would be applied. Accordingly, the invention provides about a 15% savings in water applied for this example. Thus, by using forecast weather data in computing ETo values, a substantial savings (156 hcf or 116,688 gallons) in water use can be achieved.

A number of embodiments of the present invention have been described. Nevertheless, it will be understood that various modifications may be made without departing from the spirit and scope of the invention. For example, watering schedules may be established using only predicted ETo and not predicted precipitation, or vice versa. Further, each site computer 1 can be used to calculate watering schedules from predicted meteorological data. As another example, the host computer 4 can be coupled (directly or indirectly via a communications link) to simple irrigation valves and directly implement such a computed watering schedule by turning the valves on or off. In addition, the system components shown in FIGS. 6 and 8–10 are merely examples of how the system of the present invention can be configured; other combinations of system components can thus be used to achieve efficient watering schedules according to forecasted ETo and/or precipitation. Accordingly, it is to be understood that the invention is not to be limited by the specific illustrated embodiment, but only by the scope of the appended claims.

Other combinations of system components are also possible and this is one example of how a particular group of system components can be configured to implement the invention and to achieve optimum water savings which occur when irrigation watering schedules are updated according to future ETo or forecasted precipitation.

I claim:
1. A method for efficiently controlling irrigation, including the steps of:
   (a) electronically computing a watering factor by a host computer, wherein the watering factor represents the amount of change between a reference watering schedule and a new watering schedule, wherein:
      (1) the new watering schedule is based on computed evapotranspiration (ET) data that includes at least one of forecast precipitation data or forecast meteorological data, the forecast precipitation data and forecast meteorological data comprising a current prediction of future events based upon present meteorological conditions: and
      (2) the reference watering schedule corresponds to a site control device located at an irrigation site remote from the host computer and is based upon selected characteristics of the irrigation site;
   (b) sending the watering factor from the host computer to a site control device;
   (c) adjusting the reference watering schedule by the watering factor to obtain a modified watering schedule; and
   (d) controlling at least one irrigation valve coupled to a site control device in accordance with the modified watering schedule, wherein the modified watering schedule controls when and how much to irrigate through each irrigation valve.
2. The method of claim 1, further comprising:
   (a) sending the watering factor from the site control device to a satellite control unit;
   (b) adjusting a satellite reference watering schedule by the watering factor to obtain a modified satellite watering schedule, the satellite reference watering schedule corresponding to the satellite control device;
   (c) controlling at least one satellite irrigation valve coupled to the satellite control device in accordance with the modified satellite watering schedule, wherein the modified satellite watering schedule controls when and how much to irrigate through each satellite irrigation valve.

3. The method of claim 1, further comprising:

(a) electronically computing a satellite irrigation factor by the host computer, wherein the satellite irrigation factor represents the amount of change between a satellite reference schedule and the new watering schedule, the satellite reference schedule corresponding to a satellite control device located at an irrigation site remote from the host computer and being based upon selected characteristics of such irrigation site;

(b) sending the satellite irrigation factor from the host computer to the satellite control device;

(c) adjusting the satellite reference schedule by the satellite watering factor to obtain a modified satellite irrigation schedule; and (d) controlling at least one satellite irrigation valve coupled to the satellite control device in accordance with the modified satellite irrigation schedule, wherein the modified satellite watering schedule controls when and how much to irrigate through each satellite irrigation valve.

4. The method of claim 3 wherein the satellite irrigation factor is the same as the watering factor.

5. The method of claim 1 wherein the watering factor is sent from the host computer to the site control device via a wireless connection.

6. The method of claim 1 wherein the watering factor is sent from the host computer to the site control device via a hardwired connection.

7. The method of claim 1, further comprising:

(a) sensing meteorological site data at the irrigation site by a site control device; and (b) sending the meteorological site data from a site control device to the host computer;

wherein the new watering schedule is based upon the computed ET data and the meteorological site data.

8. The method of claim 1 wherein each irrigation valve corresponds to an irrigation zone, the method further comprising:

(a) storing a unique reference watering schedule for each of the irrigation zones;

wherein each unique reference watering schedule is modified by the watering factor, and each irrigation zone is controlled in accordance with the corresponding modified watering schedule.

9. The method claim 1, further comprising:

(a) storing the reference watering schedule at the irrigation site;

(b) sending data, including the watering factor, from the irrigation site to a host computer; and (c) receiving data, including the watering factor, from the host computer to the irrigation site.

10. The method of claim 1 wherein the new watering schedule is based on similar climatic conditions of a geographic area in which the site control device is located.

11. A system for efficiently controlling irrigation, including:

(a) electronic computing means for computing a watering factor, wherein the watering factor represents the amount of change between a reference watering schedule and a new watering schedule, wherein:

(1) the new watering schedule is based on computed evapotranspiration (ET) data that includes at least one of forecast precipitation data or forecast meteorological data, the forecast precipitation data and forecast meteorological data comprising a current prediction of future events based upon present meteorological conditions; and (2) the reference watering schedule corresponds to an irrigation site remote from the electronic computing means and is based upon selected characteristics of the irrigation site;

(b) transmitting means for transmitting the watering factor; and (c) site control means, located at or near the irrigation site, for:

(1) receiving the watering factor from the transmitting means, (2) adjusting the reference watering schedule by the watering factor to obtain a modified watering schedule, and (3) controlling at least one irrigation valve coupled to the site control means in accordance with the modified watering schedule, wherein the modified watering schedule controls when and how much to irrigate through each irrigation valve.

12. The system of claim 11, further comprising:

(a) relaying means for transmitting the watering factor from the site control means; and (b) satellite control means, located at a satellite irrigation site remote from the electronic computing means, for:

(1) receiving the watering factor from the relaying means, (2) modifying a satellite reference irrigation schedule by the watering factor to obtain a modified satellite watering schedule, the satellite reference irrigation schedule corresponding to the satellite irrigation site and being based upon selected characteristics of the satellite irrigation site, and (3) controlling at least one satellite irrigation valve coupled to the satellite control means in accordance with the modified satellite watering schedule, wherein the modified satellite watering schedule controls when and how much to irrigate through each satellite irrigation valve.

13. The system of claim 11 wherein the electronic computing means is further for computing a satellite irrigation factor, the satellite irrigation factor representing the amount of change between a satellite reference schedule and the new watering schedule, the satellite reference schedule corresponding to a satellite irrigation site remote from the electronic computing means and being based upon selected characteristics of the satellite irrigation site, the system further comprising:

(a) means for transmitting the satellite irrigation factor from the electronic computing means; and (b) satellite control means, located at the satellite irrigation site, for:

(1) receiving the satellite irrigation factor, (2) adjusting the satellite reference schedule by the satellite watering factor to obtain a modified satellite irrigation schedule, and (3) controlling at least one satellite irrigation valve coupled to the satellite control means in accordance with the modified satellite irrigation schedule, the modified satellite watering schedule controlling when and how much to irrigate through each satellite irrigation valve.

14. The system of claim 11 wherein the site control means is further for:

(a) sensing meteorological site data at the irrigation site; and (b) sending the meteorological site data to the electronic computing means;

wherein the new watering schedule is based upon the computed ET data and the meteorological site data.

15. The system of claim 11 wherein the site control means includes:
   (a) clock controller means for storing the reference watering schedule; and
   (b) communications and control means for sending and receiving data, including the watering factor, to and from the electronic computing means and for modifying the reference watering schedule.

16. The system of claim 11 wherein each irrigation valve corresponds to an irrigation zone, and wherein the site control means is further for:
   (a) storing a unique reference watering schedule for each of the irrigation zones;
   (b) adjusting each unique reference watering schedule by the watering factor to obtain modified watering schedules corresponding to each of the irrigation zones; and
   (c) controlling each irrigation zone in accordance with the corresponding modified watering schedule.

17. The system of claim 11 wherein the site control means includes a clock control means for storing the reference watering schedule at the irrigation site and a communications and control means for sending and receiving data, including the watering factor, to and from a host computer.

18. The system of claim 11 wherein the electronic computing means computes a watering factor based on similar climatic conditions of a geographic area in which the site control means is located.

19. A system for efficiently controlling irrigation, including:
   (a) at least one irrigation control system, located at or near an irrigation site and coupled to at least one irrigation valve, for storing a reference watering schedule and for controlling the at least one irrigation valve; and
   (b) a host computer for computing a watering factor and for sending the watering factor to the irrigation control system, wherein the watering factor represents the amount of change between the reference watering schedule and a new watering schedule, wherein:
      (1) the new watering schedule is based on computed evapotranspiration (ET) data that includes at least one of forecast precipitation data or forecast meteorological data, the forecast precipitation data and forecast meteorological data comprising a current prediction of future events based upon present meteorological conditions; and
      the reference watering schedule is modified by the watering factor;
   wherein the irrigation control system modifies the reference watering schedule by the watering factor to obtain a modified watering schedule and controls the at least one irrigation valve in accordance with the modified watering schedule.

20. The system of claim 19 wherein the host computer computes a watering factor specific to each of the irrigation control systems.

21. The system of claim 19 wherein the irrigation control system is further for sensing meteorological site information at the irrigation site and for sending such meteorological site information to the host computer, and wherein the host computer is further for computing the new watering schedule based upon the predicted meteorological data and the meteorological site information.

22. The system of claim 19 wherein the irrigation control system includes:
   (a) a clock controller for storing the reference watering schedule; and
   (b) a communications and control device for sending and receiving data, including the watering factor, to and from the host computer and for modifying the reference watering schedule.

23. The system of claim 19 wherein each irrigation valve corresponds to an irrigation zone, and wherein the irrigation control system is further for:
   (a) storing a unique reference watering schedule for each of the irrigation zones;
   (b) adjusting each unique reference watering schedule by the watering factor to obtain modified watering schedules corresponding to each of the irrigation zones; and
   (c) controlling each irrigation zone in accordance with the corresponding modified watering schedule.

24. The system of claim 19 wherein the irrigation control system includes a clock control device for storing the reference watering schedule at the irrigation site and a communications and control device for sending and receiving data, including the watering factor, to and from a host computer.

25. The system of claim 19 wherein the host computer computes a watering factor based on similar climatic conditions of a geographic area in which the irrigation control system is located.

26. A storage device readable by a programmable control device when coupled to the storage device, the storage device containing a control program tangibly stored thereon, such that the control device is configured and operated by the control program when the storage device is read by the control device, the control program being configured to operate the control device to efficiently control an irrigation system, such control being performed by the combination of the control program and the control device to perform the functions of:
   (a) electronically computing a watering factor, wherein the watering factor represents the amount of change between a reference watering schedule and a new watering schedule, wherein:
      (1) the new watering schedule is based on computed evapotranspiration (ET) data that includes at least one of forecast precipitation data or forecast meteorological data, the forecast precipitation data and forecast meteorological cal data comprising a current prediction of future events based upon present meteorological conditions; and
      (2) the reference watering schedule corresponds to an irrigation site and is based upon selected characteristics of the irrigation site;
   (b) adjusting the reference watering schedule by the watering factor to obtain a modified watering schedule; and
   (c) applying the modified watering schedule to an irrigation control system located at or near the irrigation site to control at least one irrigation valve of the irrigation control system in accordance with the modified watering schedule.

27. The storage device of claim 26, further performing the function of:
   (d) computing the new watering schedule based upon both the computed ET data and meteorological site information from the irrigation site.

28. The storage device of claim 26 wherein the watering factor is computed based on similar climatic conditions of a geographic area in which the irrigation control system is located.

* * * * *